United States Patent
Travix et al.

(10) Patent No.: US 10,995,561 B1
(45) Date of Patent: May 4, 2021

(54) FLOWLINE COMPONENT WITH THREADED ROTATABLE FLANGE

(71) Applicant: KHOLLE Magnolia 2015, LLC, Houston, TX (US)

(72) Inventors: Todd Anthony Travix, Humble, TX (US); Larry Mitchel Hill, Cypress, TX (US); William Brent Stroebel, Houston, TX (US); Scott Taylor Donaldson, Spring, TX (US); E. Lee Colley, III, Houston, TX (US)

(73) Assignee: KHOLLE Magnolia 2015, LLC, Houston, TX (US)

( * ) Notice: Subject to any disclaimer, the term of this patent is extended or adjusted under 35 U.S.C. 154(b) by 0 days.

(21) Appl. No.: 15/804,353

(22) Filed: Nov. 6, 2017

Related U.S. Application Data

(63) Continuation-in-part of application No. 15/636,598, filed on Jun. 28, 2017, which is a continuation-in-part of application No. 15/499,673, filed on Apr. 27, 2017.

(Continued)

(51) Int. Cl.
*E21B 17/05* (2006.01)
*E21B 17/20* (2006.01)
(Continued)

(52) U.S. Cl.
CPC ............ *E21B 17/05* (2013.01); *F16L 23/024* (2013.01); *E21B 7/067* (2013.01); *E21B 17/20* (2013.01)

(58) Field of Classification Search
CPC ... F16L 23/0283; F16L 19/02; F16L 19/0206; F16L 23/20; F16L 23/16; F16L 23/162;
(Continued)

(56) References Cited

U.S. PATENT DOCUMENTS 1,926,107 A * 9/1933 Morehead ............... F16L 23/16
285/368
2,211,983 A * 8/1940 Parris ...................... F16L 17/08
285/364

(Continued)

FOREIGN PATENT DOCUMENTS

EP 1148284 A1 10/2001

OTHER PUBLICATIONS

Global Supply Line, API 6A (6B) Flanges, 2014, p. 1 (Year: 2014).*
(Continued)

*Primary Examiner* — Matthew Troutman
*Assistant Examiner* — William S. Choi
(74) *Attorney, Agent, or Firm* — Keith B. Willhelm

(57) ABSTRACT

A rotatable flanged component is adapted for assembly into a flow line of a high-pressure fluid transportation system. The rotatable flanged component comprises a body and a conduit. The body has at least two ends. The conduit extends between the ends. The rotatable component also has a flange and a union face at each of the ends. The flanges and union faces are adapted to provide a flange union between the component and other flowline components at each the body end. At least one of the flanges is a rotatable flange. The rotatable flange has a central opening and a plurality of holes. The holes are adapted to accommodate threaded connectors for loading the flange with an axial force. The flange is mounted on the body end through the central opening for rotation and for transmission of the axial force to the body end.

31 Claims, 21 Drawing Sheets

Related U.S. Application Data

(60) Provisional application No. 62/465,851, filed on Mar. 2, 2017.

(51) Int. Cl.
*E21B 7/06* (2006.01)
*F16L 23/024* (2006.01)

(58) Field of Classification Search
CPC ..... F16L 23/0286; F16L 23/024; E21B 17/05; E21B 7/067; E21B 17/20
USPC .... 285/127.1, 388, 179, 282, 405, 411, 412, 285/415, 368, 363, 414
See application file for complete search history.

(56) References Cited

U.S. PATENT DOCUMENTS

| | | | |
|---|---|---|---|
| 2,422,009 A * | 6/1947 | Goetze | 285/363 |
| 2,552,750 A * | 5/1951 | Thornhill | F16L 23/20 |
| | | | 285/363 |
| 2,568,414 A * | 9/1951 | Russ | F16L 23/125 |
| | | | 285/110 |
| 2,944,842 A * | 7/1960 | Stiff | F16L 23/18 |
| | | | 285/368 |
| 3,157,414 A | 11/1964 | Sturm | |
| 4,354,698 A | 10/1982 | Linder et al. | |
| 4,557,509 A | 12/1985 | Giebeler | |
| 4,712,812 A * | 12/1987 | Weir, III | F16L 25/14 |
| | | | 285/906 |
| 4,776,617 A | 10/1988 | Sato | |
| 5,492,373 A * | 2/1996 | Smith | F16L 23/024 |
| | | | 285/368 |
| 5,720,501 A | 2/1998 | Ortloff et al. | |
| 5,860,676 A | 1/1999 | Brzezicki et al. | |
| 8,113,545 B2 | 12/2012 | Takahashi | |
| 8,465,268 B2 | 6/2013 | Baxter et al. | |
| 8,839,867 B2 | 9/2014 | Conrad | |
| 8,978,763 B2 | 3/2015 | Guidry | |
| 9,068,450 B2 | 6/2015 | Guidry | |
| 9,227,252 B2 | 1/2016 | Horiguchi | |
| 9,255,469 B2 | 2/2016 | Conrad | |
| 9,470,349 B2 | 10/2016 | Am et al. | |
| 9,518,430 B2 | 12/2016 | Guidry | |
| 9,903,190 B2 | 2/2018 | Conrad et al. | |
| 10,132,146 B2 | 11/2018 | Guidry | |
| 10,323,475 B2 | 6/2019 | Christopherson et al. | |
| 2006/0131873 A1 | 6/2006 | Klingbail et al. | |
| 2007/0114039 A1 | 5/2007 | Hobdy et al. | |
| 2010/0032945 A1 * | 2/2010 | Baker | F16L 23/20 |
| | | | 285/368 |
| 2013/0175039 A1 * | 7/2013 | Guidry | E21B 17/05 |
| | | | 285/147.1 |

OTHER PUBLICATIONS

Cameron, Monoline Flanged-Connection Fracturing Fluid Delivery Technology (2016 Schlumberger), p. 1 (Year: 2016).*
Sypris Technologies, Inc., *Flanges* (Feb. 2014).
Werner Solken, *What is a Swivel Ring Flange?*(© 2008-2019).
Cameron, *Frac Manifold Systems—Increase Operational Efficiencies of Simultaneous Completion Operations* (© 2016 Schlumberger).
Cameron, *Monoline Flanged-Connection Fracturing Fluid Delivery Technology* (© 2016 Schlumberger).
Figures 1 and 2, U.S. Appl. No. 62/465,851, filed Mar. 2, 2017.
Weatherford, *Weatherford Transformer R7 Wellhead System* (Jun. 2013).

* cited by examiner

FLOWLINE COMPONENT WITH THREADED ROTATABLE FLANGE

FIELD OF THE INVENTION

The present invention relates generally to fluid transportation systems and flow lines used in those systems, and especially to flow lines and flow line components used to convey abrasive, corrosive fluids under high pressure as are common, for example, in the oil and gas industry.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer, and thus, the porous layer forms an area or reservoir in which hydrocarbons will collect. A well is drilled through the earth until the hydrocarbon bearing formation is reached. Hydrocarbons then can flow from the porous formation into the well.

In what is perhaps the most basic form of rotary drilling methods, a drill bit is attached to a series of pipe sections referred to as a drill string. The drill string is suspended from a derrick and rotated by a motor in the derrick. A drilling fluid or "mud" is pumped down the drill string, through the bit, and into the well bore. This fluid serves to lubricate the bit and carry cuttings from the drilling process back to the surface. As the drilling progresses downward, the drill string is extended by adding more pipe sections.

When the drill bit has reached the desired depth, larger diameter pipes, or casings, are placed in the well and cemented in place to prevent the sides of the borehole from caving in. Cement is introduced through a work string. As it flows out the bottom of the work string, fluids already in the well, so-called "returns," are displaced up the annulus between the casing and the borehole and are collected at the surface.

Once the casing is cemented in place, it is perforated at the level of the oil-bearing formation to create openings through which oil can enter the cased well. Production tubing, valves, and other equipment are installed in the well so that the hydrocarbons may flow in a controlled manner from the formation, into the cased well bore, and through the production tubing up to the surface for storage or transport.

This simplified drilling and completion process, however, is rarely possible in the real world. Hydrocarbon bearing formations may be quite deep or otherwise difficult to access. Thus, many wells today are drilled in stages. An initial section is drilled, cased, and cemented. Drilling then proceeds with a somewhat smaller well bore which is lined with somewhat smaller casings or "liners." The liner is suspended from the original or "host" casing by an anchor or "hanger." A seal also is typically established between the liner and the casing and, like the original casing, the liner is cemented in the well. That process then may be repeated to further extend the well and install additional liners. In essence, then, a modern oil well typically includes a number of tubes telescoped wholly or partially within other tubes.

Moreover, hydrocarbons are not always able to flow easily from a formation to a well. Some subsurface formations, such as sandstone, are very porous. Hydrocarbons can flow easily from the formation into a well. Other formations, however, such as shale rock, limestone, and coal beds, are only minimally porous. The formation may contain large quantities of hydrocarbons, but production through a conventional well may not be commercially practical because hydrocarbons flow though the formation and collect in the well at very low rates. The industry, therefore, relies on various techniques for improving the well and stimulating production from formations. In particular, various techniques are available for increasing production from formations which are relatively nonporous.

One technique involves drilling a well in a more or less horizontal direction, so that the borehole extends along a formation instead of passing through it. More of the formation is exposed to the borehole, and the average distance hydrocarbons must flow to reach the well is decreased. Another technique involves creating fractures in a formation which will allow hydrocarbons to flow more easily. Indeed, the combination of horizontal drilling and fracturing, or "frac'ing" or "fracking" as it is known in the industry, is presently the only commercially viable way of producing natural gas from the vast majority of North American gas reserves.

Fracturing a formation is accomplished by pumping fluid, most commonly water, into the well at high pressure and flow rates. Proppants, such as grains of sand, ceramic or other particulates, usually are added to the fluid along with gelling agents to create a slurry. The slurry is injected into the formation, fracturing it and creating flow paths to the well. The proppant serves to prevent fractures from closing when pumping is stopped.

A formation typically will be fractured in many different locations or zones, but rarely, if ever, will it be fractured all at once. A liner first will be installed in the well. The liner may incorporate a series of valves which may be opened and plugged to fracture multiple zones in a desired sequence. Alternately, the liner may be a standard tubular and the formation fractured by a so-called "plug and perf" operation. The liner will be perforated in a first zone near the bottom of the well. Fluids then are pumped into the well to fracture the formation in the vicinity of the bottom perforations. After the initial zone is fractured, a plug is installed in the liner at a point above the fractured zone. The liner is perforated again, this time in a second zone located above the plug. That process is to repeated for zones further up the formation until the formation has been completely fractured.

Once the well is fractured, the large quantities of water and sand that were injected into the formation eventually must be allowed to flow out of the well. The water and sand will be separated from hydrocarbons produced by the well to protect downstream equipment from damage and corrosion. The production stream also may require additional processing to neutralize corrosive agents in the stream.

Systems for successfully completing a fracturing operation, therefore, are extensive and complex, as may be appreciated from FIG. 1. Water from tanks 1 and gelling agents dispensed by a chemical unit 2 are mixed in a hydration unit 3. The discharge from hydration unit 3, along with sand carried on conveyors 4 from sand tanks 5 is fed into a blending unit 6. Blender 6 mixes the gelled water and sand into a slurry. The slurry is discharged through low-pressure hoses 7 which convey it into two or more low-pressure lines 8 in a frac manifold 9. The low-pressure lines 8 in frac manifold 9 feed the slurry to an array of pumps 10, perhaps as many as a dozen or more, through low-pressure "suction" hoses 11.

Pumps 10 take the slurry and discharge it at high pressure through individual high-pressure "discharge" lines 12 into two or more high-pressure lines or "missiles" 13 on frac manifold 9. Missiles 13 flow together, i.e., they are manifolded on frac manifold 9. Several high-pressure flow lines 14 run from the manifolded missiles 13 to a "goat head" 15. Goat head 15 delivers the slurry into a "zipper" manifold 16 (also referred to by some as a "frac manifold"). Zipper manifold 16 allows the slurry to be selectively diverted to, for example, one of two well heads 17. Once fracturing is complete, flow back from the fracturing operation discharges into a flowback manifold 18 which leads into flowback tanks 19.

Frac systems are viewed as having "low-pressure" and "high-pressure" sides or, more simply, as having low sides and high sides. The low side includes the components upstream of the inlet of pumps 10, e.g., water tanks 1, hydration unit 3, blending unit 6, and the low-pressure lines 8 of frac manifold 9, which operate under relatively low pressures. The high side includes all the components downstream of the discharge outlets of pumps 10, e.g., the high-pressure missiles 13 of frac manifold 9 and flow lines 14 running to goat head 15, which operate under relatively high pressures.

The larger units of a frac system are transported to a well site on skid, trailers, or trucks and then connected by one kind of conduit or another. The conduits on the low-pressure side typically will be flexible hoses, such as blender hoses 7 and suction hoses 11. On the other hand, flow lines 14 running to goat head 15 and other high-pressure side conduits will be subject to extremely high pressures. They must be more rugged. They also typically will be assembled on site.

Flow lines 14 and other portions of the high-side that are assembled on site are made up from a variety of components often referred to as "frac iron," "flow iron," or "ground iron." Such components include sections of straight steel pipe, such as pup joints. They also include various fittings, such as tees, crosses, laterals, and wyes, which provide junctions at which flow is split or combined. In addition to junction fittings, flow line components include fittings which are used to alter the course of a flow line. Such directional fittings include elbows and swivel joints. High-pressure flow lines also incorporate gauges and other monitoring equipment, as well as control devices such as shut off, plug, check, throttle, pressure release, butterfly, and choke valves.

Because frac systems are required at a site for a relatively short period of time, frac iron components often are joined by unions. Unions allow the components to be connected ("made up") and disconnected ("broken down") relatively quickly. The three types of unions commonly used in frac systems are hammer (or "Weco®") unions, clamp (or "Greyloc®") unions, and flange unions. Though spoken of in terms that may imply they are discreet components, unions are actually interconnected subassemblies of the components joined by the union. A male sub will be on one component, and a mating female sub will be on the other. The subs then will be connected to each other to provide the union.

Flange unions, at least in comparison to threaded connections, may be made up and broken down with relative ease. Their basic design is robust and reliable, and like other flowline components, they are manufactured from heavy, high tensile steel. Thus, they have been adapted for low pressure (1,000 to 2,000 psi), medium pressure (2,000 to 4,000 psi), and high pressure service (6,000 to 20,000 psi). Moreover, unlike hammer and clamp unions, flange unions do not rely on seals that are exposed to fluids passing through the union.

Flange unions, as their name implies, typically provide a connection between two flanged components, such as spooled pipe or simply "spools." Spooled pipe is provided with annular flanges extending radially outward from each end, thus giving the pipe the appearance of a spool. The flanges provide flat surfaces or faces which allow two spools to mate at their flanges. The flanges also are provided with a number of bolt holes. The holes are arranged angularly around the flange. Thus, spooled pipes may be connected by bolting mating flanges together. Each flange will have an annular groove running concentrically around the pipe opening. An annular metal seal is carried in the grooves to provide a seal between the flanges.

Though not entirely apparent from the schematic representation of FIG. 1, it will be appreciated that conventional frac systems are assembled from a very large number of individual components. Assembly of so many units on site can be time consuming, expensive, and hazardous. Thus, some components of a frac system are assembled off site on skids or trailers and transported as a unit to the well site.

Commonly skidded units include not only process units, such as blender 6 and pumps 10, but also flow units. Frac manifold 9, for example, is an assembly of pipes, junctions, valves, and other flow line components that typically are assembled off-site. Collectively, they provide a flow unit that manifolds, distributes, and controls discharge from pumps 10. Zipper manifold 16 is another flow unit that at times is assembled off-site from separate flow line components. Zipper manifold 16 receives flow from flow lines 14 and selectively distributes it to multiple well heads 17.

Such units may have been assembled on site in the past. By skidding them, assembly time at the well site is greatly reduced. Moreover, the components typically may be assembled more efficiently and reliably, and may be tested more easily in an off-site facility. At the same time, however, a well head is fixed. Skidded units can be quite large, heavy, and moveable only with difficulty and limited precision. Flow lines, therefore, necessarily incorporate directional fittings, such as elbows and swivel joints, which allow its course to be altered to accommodate two unaligned units.

Elbow joints are simply curved sections of pipe which provide, for example, a 90° turn in a line. Swivel joints most commonly are an assembly of elbow conduits, usually three, with rotatable joints. The joints are packed with bearings, typically ball bearings, which allow the elbow conduits to rotate relative to each other. Swivel joints, therefore, can accommodate varying degrees of misalignment between the components which they connect and can provide considerable flexibility in assembling a flow line between essentially immovable points.

Though much less common, swivel flanges also are used to provide similar flexibility. Swivel flanges have a flange mounted on a hub. The hub is formed, for example, at one end of a length of pipe. Bearings, usually roller bearings, are packed around the hub, and the flange can rotate around the hub on the bearings. When joined together, a pair of swivel-flanged pipes and a pair of elbow joints, like swivel joints, can accommodate varying alignments between components to be joined. Consequently, it is rare, if ever, that the high-side of a frac system does not incorporate at least one or, more likely, multiple swivel joints or swivel flanges.

The large number of individual components in a frac system is compounded by the fact that most conventional frac systems incorporate a large number of relatively small flow lines, typically 3" and 4" flow lines. In part that is unavoidable. The pumps cannot be deployed in series and the flow lines carrying their individual discharges must be manifolded. Likewise, if multiple wells are to be serviced by the same array of pumps without assembling and disassembling flow lines, at some point their collective discharge must be split or directed into different flowline segments.

On the other hand, multiple flow lines in many instances represent a design choice. That is, certain flow rates and pressures will be required to fracture a particular well. Those flow rates and pressures will determine the number and capacities of the pumps. The high-pressure side then is designed to deliver the required flow rate without exceeding a maximum or "erosional" flow velocity, typically about 40'/sec, through the system. Additional flow lines often are added to provide higher flow rates into a well. The net result is that a fracking system often is so complicated that it resembles to the uninitiated a tangled mass of spaghetti.

Efforts have been made to simplify the flow line by incorporating fewer segments. For example, the conventional frac system illustrated in FIG. 1 includes four flow lines 14 running from the high-pressure lines 13 of frac manifold 9 to goat head 15. Some frac systems now employ a single, larger flowline segment running in place of four smaller lines. A single larger flow line will incorporate fewer parts and, therefore, fewer potential leak points. Both in terms of direct material and labor costs, a single larger flow line often will be less expensive than multiple smaller lines.

Frac jobs also have become more extensive, both in terms of the pressures required to fracture a formation and the time required to complete all stages of an operation. Prior to horizontal drilling, a typical vertical well might require fracturing in only one, two or three zones at pressures usually well below 10,000 psi. Fracturing a horizontal well, however, may require fracturing in 20 or more zones. Horizontal wells in shale formations such as the Eagle Ford shale in South Texas typically require fracturing pressures of at least 9,000 psi and 6 to 8 hours or more of pumping. Horizontal wells in the Haynesville shale in northeast Texas and northwest Louisiana require pressures around 13,500 psi. Pumping may continue near continuously—at flow rates of 2 to 3 thousand gallons per minute (gpm)—for several days before fracturing is complete.

Moreover, at least in the early stages of production, the flow back after fracturing also will be at high pressure and flow rates. The initial production stream from a fractured well flows at pressures in the range of from 3,000 to 5,000 psi, and more and more commonly up to 10,000 psi. The flow rates can approach a million cubic feet per hour or more. Thus, high-pressure flowline components are required to endure extremely abrasive fluids flowing at extremely high pressures and rates and, hopefully, to do so over an extended service life.

Given the high number of components, leaking at unions is always a concern in frac systems. The unions may not always be assembled properly. Even when assembled to specification, however, such issues are exacerbated by the extremely high pressures and flow rates through the system. Many unions also incorporate elastomeric seals which are exposed to flow through the conduit and are particularly susceptible to leaking.

Moreover, the abrasive and corrosive nature of the slurry flowing through a frac system not only will accelerate deterioration of exposed elastomeric seals, it can rapidly erode and weaken conduit walls. Flow through relatively long straight sections of pipe is relatively laminar. Flow through other areas, however, such as unions where exposed seals often are present, may be quite turbulent. Erosion also is a more significant issue where a flow line changes directions. Flow will more directly impact conduit walls, causing more abrasion than that caused simply by fluid passing over the walls.

Flowline components also are quite expensive. Swivel joints and swivel flanges in particular are expensive and often comprise the single largest part expense of a high-side flow line. At the same time, the general issues discussed above seem to be more focused in respect to swivel joints and swivel flanges. Swivel joints often incorporate exposed elastomeric seals. Flow through swivel joints is relatively turbulent. Because they incorporate rotatable joints and connect unaligned components, swivel joints and swivel flanges are particularly susceptible to bending stress caused by vibration in the flow line. They also may be disassembled on site for service and may not always be reassembled to specification.

The statements in this section are intended to provide background information related to the invention disclosed and claimed herein. Such information may or may not constitute prior art. It will be appreciated from the foregoing, however, that there remains a need for new and improved high-pressure flowline unions and methods for connecting flowline components. Such disadvantages and others inherent in the prior art are addressed by various aspects and embodiments of the subject invention.

SUMMARY OF THE INVENTION

The subject invention, in its various aspects and embodiments, relates generally to fluid transportation systems and flow lines used in those systems and encompasses various embodiments and aspects, some of which are specifically described and illustrated herein. One aspect of the invention provides for a rotatable flanged component which is adapted for assembly into a flow line of a high-pressure fluid transportation system. The rotatable flanged component comprises a body and a conduit. The body has at least two ends. The conduit extends between the ends. The rotatable component also has a flange and a union face at each of the ends. The flanges and union faces are adapted to provide a flange union between the component and other flowline components at each the body end. At least one of the flanges is a rotatable flange. The rotatable flange has a central opening and a plurality of holes. The holes are adapted to accommodate threaded connectors for loading the flange with an axial force. The flange is mounted on the body end through the central opening for rotation about an axis normal to the union face and for transmission of the axial force to the body end.

Other embodiments of the subject invention provide such rotatable flanged components where the body end has external threads. The central opening of the rotatable flange has internal threads engaging the external threads on the threaded body end. The threaded engagement between the rotatable flange and the threaded body end allows rotation between the body and the flange and transmits axial force from the rotatable flange to the body end.

The invention also provides such rotatable flanged components where the component comprises stops to limit the rotation of the rotatable flange, components where the body end comprises a shoulder providing a first stop limiting rotation in one direction and a snap ring limiting rotation in the other direction, and components where the rotation of the rotatable flange is limited to about 360°.

Still other embodiments and aspects of the invention are directed to such rotatable flanged components where the body end is provided with a stop transferring the axial force from the rotatable flange to the body end. Other embodiments provide such rotatable flanged components where the stop comprises a plurality of retainer segments engaging the body end and the rotatable flange.

Yet other embodiments provide such rotatable flanged components where the segments have a radially enlarged inward end which is carried in an external groove in the body end and which provides an outward-facing shoulder. The rotatable flange engages the segment inward end.

Additional aspects and embodiments provide rotatable flanged components where the component is a block fitting.

Still other embodiments provide rotatable flanged components where the holes accommodate the passage of the threaded connectors through the flange or where the holes are bottomed holes accommodating engagement with the threaded connectors.

In other aspects, the invention provides rotatable flanged components where the conduit provides a change in direction through the component. Thus, the component is adapted to provide a change in direction in a flow line. Other embodiments provide rotatable flanged components where the union faces are perpendicular to each other and the conduit is a long sweep conduit providing a 90° turn.

Further embodiments provide rotatable flanged components where the flange on each body end is a rotatable flange. Other embodiments provide rotatable flanged components where the component is a directional fitting or a junction fitting comprising three body ends, at least one, or all of which have rotatable flanges. Still other embodiments provide rotatable flanged components having two or more axes of rotation.

The novel rotatable flanged components also include such components wherein one or more of the various features mentioned above are provided in various combinations.

In other aspects, the invention provides a rotatable flowline assembly, such as a swivel joint, which is adapted for assembly into a high-pressure fluid transportation system. The assemblies may comprise two novel rotatable flanged components and provide two or three axes of rotation. Other embodiments provide such assemblies comprising three novel rotatable flanged components and provide three or four axes of rotation. Still other embodiments provide such assemblies comprising four or more novel rotatable flanged components which provide four or more axes of rotation.

The invention also provides for flow lines for high-pressure fluid transportation system. The flow lines comprise a novel rotatable flanged component or a novel rotatable flowline assembly which is assembled into the flow line by flange unions. Other embodiments are directed to high-pressure fluid transportation systems, such as frac systems. The systems comprise a flow line of the subject invention.

Especially preferred aspects and embodiments of the subject invention include frac systems comprising a plurality of pumping units, a well head, and a single such flow line. Each of the pumps have discharge lines which are connected to the single flow line. The single flow line is connected to the well head. Thus, all fluid discharged from the pumps is conveyed by the single flow line to the well head. In other embodiments, the well head may comprise a zipper manifold.

Still other embodiments provide methods for assembling a flow line for a high-pressure fluid transportation system. The method comprises assembling a novel rotatable flanged component or rotatable flowline assembly into the flow line by connecting the rotatable flanged component to other flowline components by a flange union.

Further embodiments provide methods for providing a change in direction in a flow line for a high-pressure fluid transportation system. The methods comprise assembling a novel rotatable flanged component into the flow line by connecting the rotatable flanged component to other flowline components by a flange union.

In other aspects and embodiments, the invention provides still other rotatable flanged components adapted for assembly into a flow line of a high-pressure fluid transportation system. The rotatable flanged components comprise a rotatable flange and a union face. The rotatable flange and union face are adapted to provide a flange union between the rotatable flanged component and a second flanged component. The components further comprise a separator adapted for use with the rotatable flanged component. The separator separates the union face on the rotatable flanged component from a union face of the second flanged component and, preferable, from any seals present.

Additional embodiments provide such rotatable flanged components where the separator is adapted to allow the rotatable flanged component to be loosely made up with the second flanged component.

Other aspects and embodiments provide such rotatable flanged components where the separator is adapted to provide clearance between the union face on the rotatable flanged component and the union face of the second flanged component.

Still other embodiments provide such rotatable flanged components which comprise threaded connectors adapted to connect the flange of the rotatable flanged component and a flange of the second flanged component. The separators comprise spacers, such as lock nuts threaded on the threaded connectors.

Still other embodiments provide such rotatable flanged components which comprise threaded connectors adapted to connect the flange of the rotatable flanged component and a flange of the second flanged component. The separators comprise deformable spacers, such as elastomeric grommets or Belleville washers carried around the threaded connectors.

Further embodiments provide such rotatable flanged components where the separator comprises a bearing plate. The bearing plates is adapted to allow the union face on the rotatable flanged component and the union face of the second flanged component to rotate relative to each other on the bearing plate.

Additional embodiments provide such rotatable flanged components comprising threaded connectors and a bearing plate. The threaded connectors are adapted to connect the flange of the rotatable flanged component and a flange of the second flanged component. The bearing plate comprises slots or holes adapted to allow passage of the threaded connectors.

In yet other aspects and embodiments, the invention provides novel methods for making up flange unions between rotatable flanged components and other flanged components. The rotatable flanged components comprise a rotatable flange and a union face. The other flanged components comprise a flange and a union face. The method comprises extending the rotatable flange beyond the plane of the union face on the rotatable flanged component. The rotatable flanged component then is loosely assembled to the other flanged component. When loosely assembled, the extended rotatable flange provides clearance between the union face of the rotatable flanged component and the union face of the other flanged component. The rotatable flanged component then is positioned relative to the other flowline component by rotating the rotatable flanged component about the rotatable flange. Once the rotatable flanged component is positioned relative to the other component, the rotatable flange is withdrawn within the plane of the union face on the rotatable flanged component. With the rotatable flange in it withdrawn position, the flange union may be made up between the rotatable flanged component and the other flanged component.

Other embodiments provide such methods where the rotatable flange of the rotatable flanged component and the flange of the second flanged component bear on each other when the rotatable flanged component and the second flanged component are loosely assembled.

Additional embodiments provide such methods where the flange union is made up with standard or double-end threaded bolts.

Finally, still other aspect and embodiments of the invention will have various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the manner in which it may be practiced. The subject invention encompasses other embodiments consistent with the claims set forth herein.

BRIEF DESCRIPTION OF THE DRAWINGS

FIG. 12A shows rotatable elbow fittings 440 in a partially or "loosely" made up state.

FIG. 12B shows rotatable elbow fittings 440 in a fully made up state.

Figure 1:
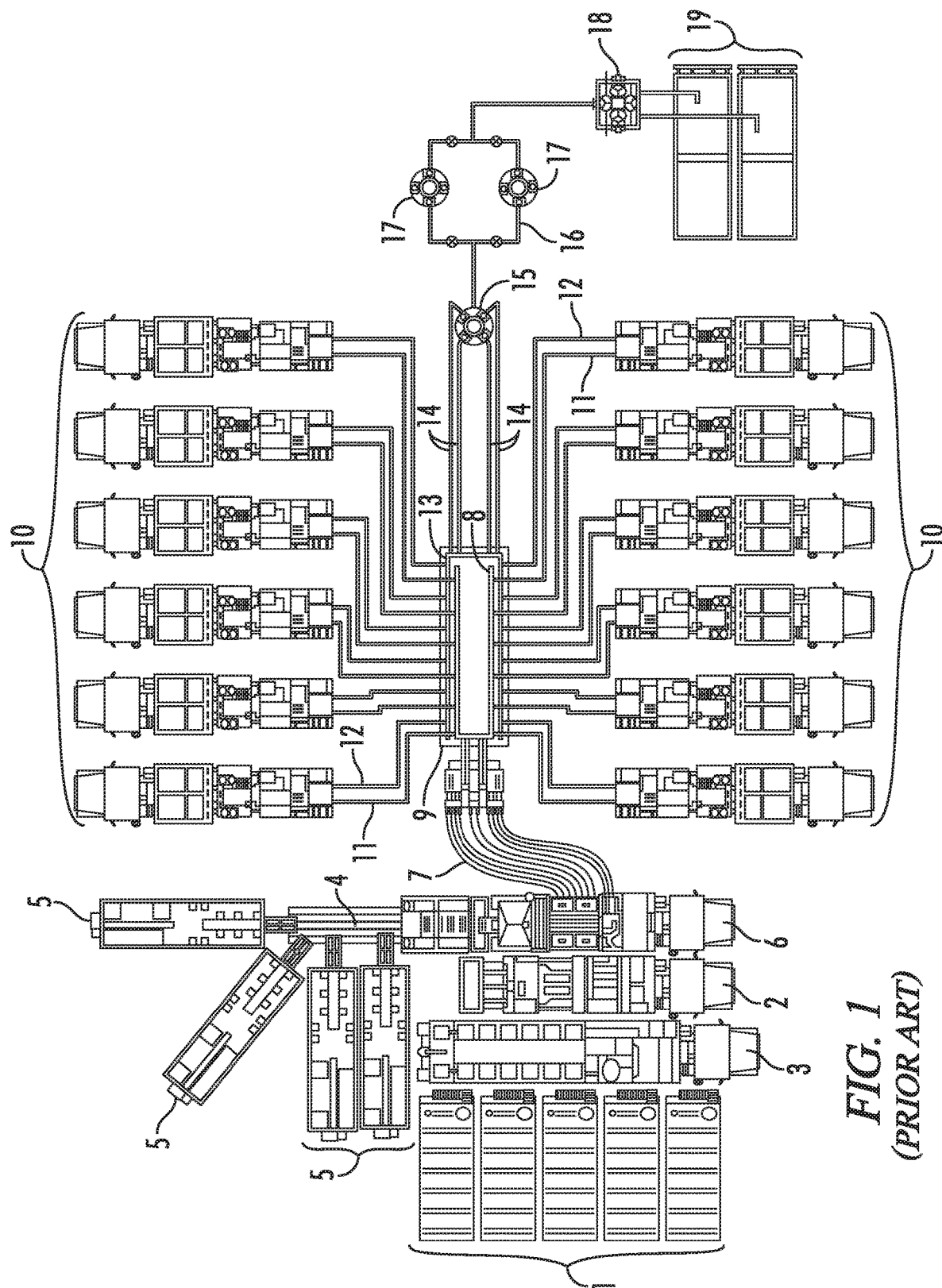
FIG. 1 (prior art) is a schematic view of a system for fracturing a well and receiving flow back from the well, which system includes various high-pressure flow lines, such as flow lines 12 and 14.

In the drawings and description that follows, like parts are identified by the same reference numerals. The drawing figures are not necessarily to scale. Certain features of the embodiments may be shown exaggerated in scale or in somewhat schematic form and some details of conventional design and construction may not be shown in the interest of clarity and conciseness.

DESCRIPTION OF ILLUSTRATIVE EMBODIMENTS

The invention, in various aspects and embodiments, is directed generally to fluid transportation systems and flow lines used in those systems, and especially to flow lines and flowline components that are used to convey abrasive, corrosive fluids under high pressure. Various specific embodiments will be described below. For the sake of conciseness, all features of an actual implementation may not be described or illustrated. In developing any actual implementation, as in any engineering or design project, numerous implementation-specific decisions must be made to achieve a developers' specific goals. Decisions usually will be made consistent within system-related and business-related constraints, and specific goals may vary from one implementation to another. Development efforts might be complex and time consuming and may involve many aspects of design, fabrication, and manufacture. Nevertheless, it should be appreciated that such development projects would be a routine effort for those of ordinary skill having the benefit of this disclosure.

The novel flowlines and flowline components typically will be used to connect process or flow units for temporary fluid transportation systems. They are particularly useful for temporary installations that must be assembled and disassembled on site. Such systems are common in chemical and other industrial plants, on marine dredging vessels, strip mines, and especially in the oil and gas industry. Frac systems, such as those shown in FIG. 1, are a very common application where temporary high-pressure flow lines are routinely used to provide fluid conduits between process or flow units.

Figure 2:
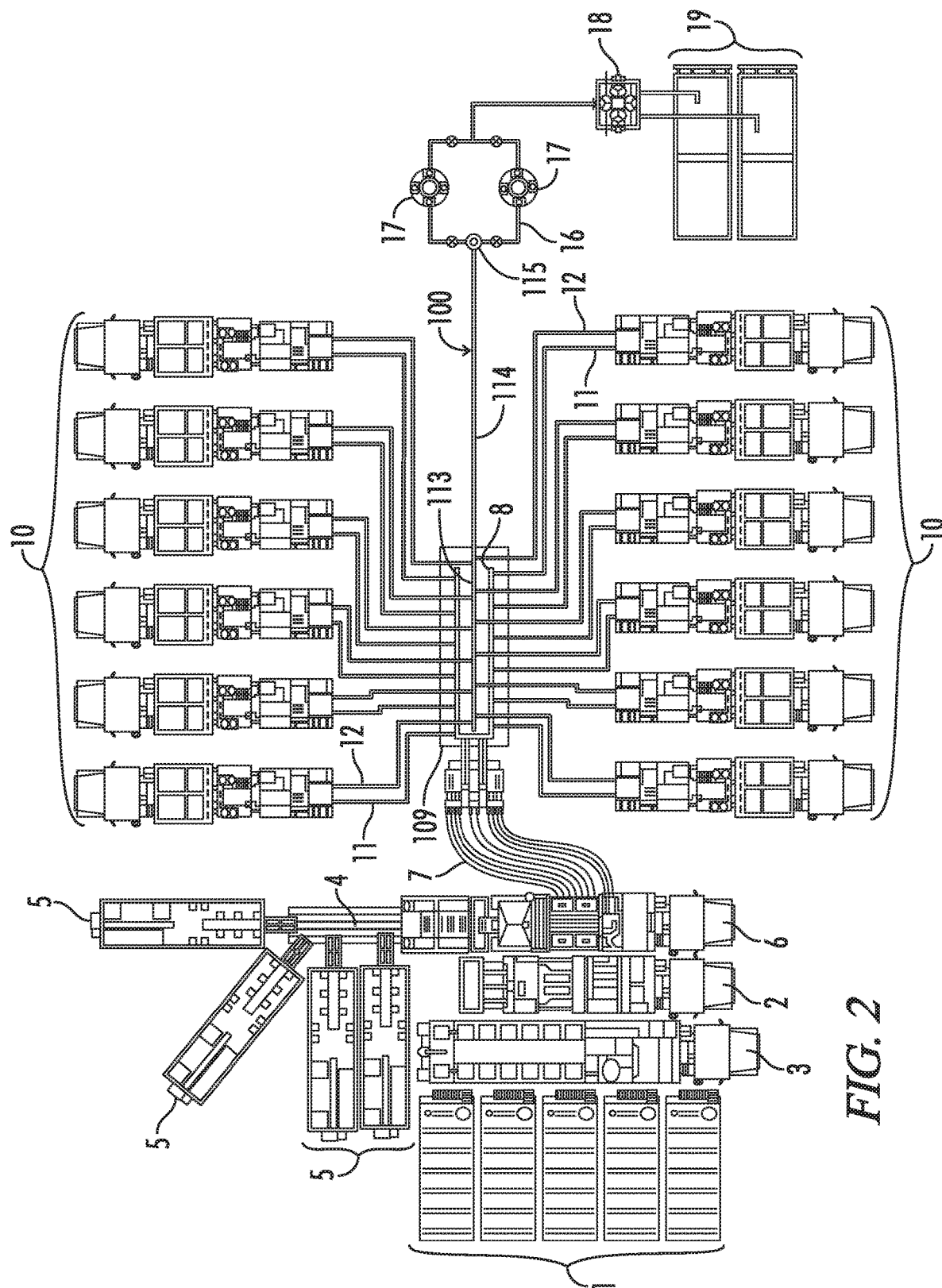
FIG. 2 is a schematic view of a frac system incorporating a first preferred embodiment 100 of the flow lines of the subject invention, which flow line 100 provides a single high-pressure conduit between pumps 10 and zipper manifold 16.

The novel flow lines and flowline components are particularly suited for use in frac systems such as the system shown in FIG. 1. For example, a first preferred embodiment 100 of the flow lines of the subject invention is shown schematically in FIG. 2. In many respects the novel frac system shown in FIG. 2 is identical to the frac system of FIG. 1. It will be noted, however, that the frac system of FIG. 1 incorporates a pair of relatively small diameter missiles 13 in frac manifold 9. Missiles 13 receive the discharge from pumps 10. That system also has four relatively small diameter high-pressure flow lines 14 which feed into goat head 15. In contrast, the novel system shown in FIG. 2 incorporates a novel frac manifold 109 which is part of a single flow line 100. Flow line 100 carries the entire discharge from pumps 10 and runs from discharge lines 12 of pumps 10 to a junction head 115 of zipper manifold 16.

Figure 3:
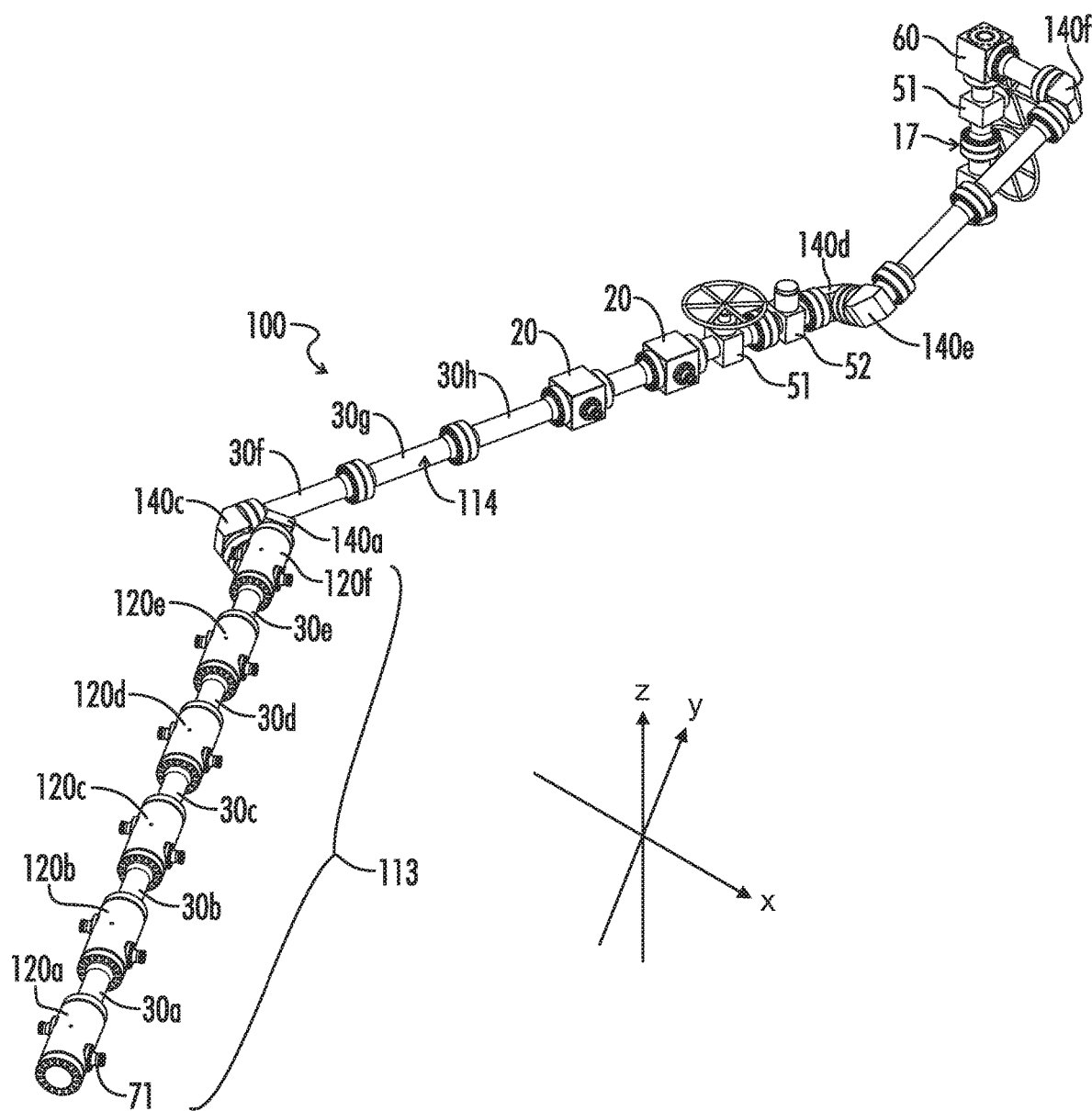
FIG. 3 is an isometric view of novel flow line 100 incorporating first embodiments 140 of the rotatable flowline components of the subject invention, which first embodiment 140 is a rotatable elbow fitting.
Figure 4:
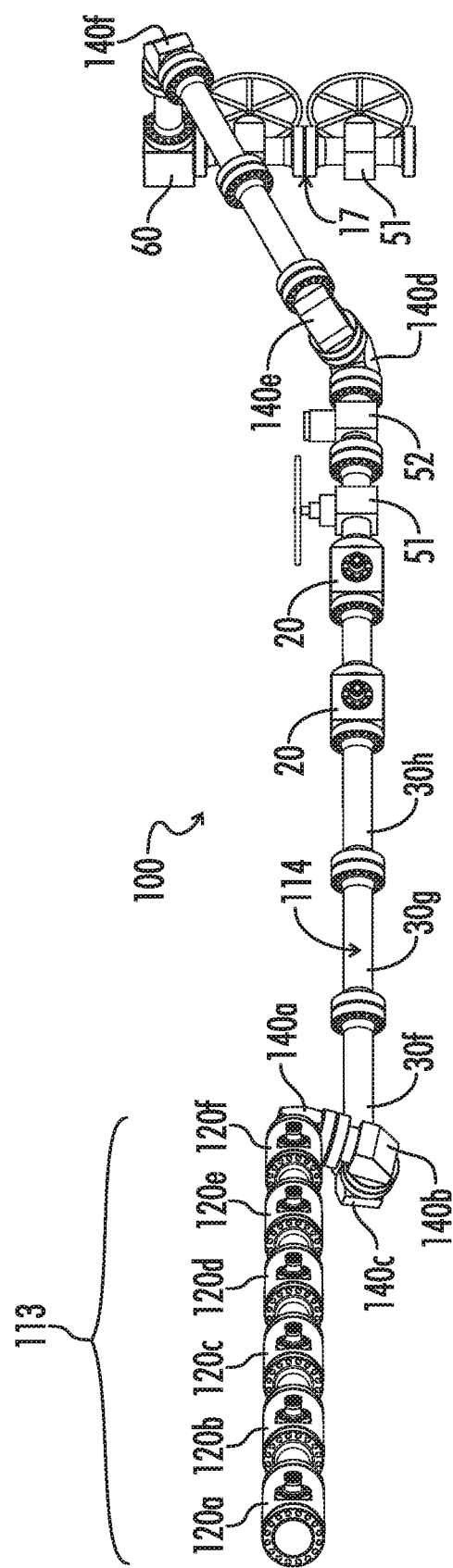
FIG. 4 is an elevational view of flow line 100 shown in FIG. 3.

Flow line 100 incorporates a first preferred embodiment 140 of the novel rotating flowline components and is shown in greater detail in FIGS. 3-4. As seen therein, flow line 100 generally comprises offset cross junctions 120, a 4-axis swivel joint subassembly 101 having three rotatable elbows 140, spools 30, block cross junctions 20, valves 51 and 52, a 3-axis swivel joint subassembly 102 having two rotatable components 140, and a single rotatable elbow 140f. It will be noted that for the sake of simplification, FIGS. 3-4 show flow line 100 as connecting to a single well head 17 whereas in FIG. 2 flowline is illustrated as feeding into junction head 15 of zipper manifold 16.

Well head 17 comprises a block tee connector 60 and a pair of manual gate valves 51. In accordance with common industry practice, many other components may be assembled into well head 17. Such components also are not illustrated for the sake of simplicity. It also will be appreciated that in the context of novel flow lines which are adapted to deliver fluid from a plurality of pump discharges to a well head, the well head not only will be considered to include such conventional well head assemblies, but also zipper manifolds and the like which may selectively divert flow into a plurality of individual well heads.

Offset cross junctions 120a-120f are connected to an array of pumps 10 (not shown in FIGS. 3-4). More specifically, each offset cross junction 120a-120f is connected to two pumps 10 positioned on opposite sides of flow line 100, and the collection of junctions 120 are interconnected by spools 30a-30e. Offset cross junctions 120 have a somewhat elongated, generally cylindrical body. Though not illustrated in the figures, it will be appreciated that offset cross junctions 120 have a main bore extending through the body. That bore provides the primary conduit through which slurry passes as it is conveyed to towards well head 17. The primary bore extends between opposing, generally parallel, flat surfaces or union faces on each end of cross junction 120. The center of the primary bore may be viewed as defining the central axis of offset cross junction 120.

The union faces on cross junctions 120 are provided with, for example, 16 bottomed holes. The holes are arranged angularly about the primary conduit. The holes typically are threaded to accept standing bolts, threaded studs, double-end threaded bolts, or other threaded connectors which allow mating components, such as spools 30 to be joined to offset cross junctions 120 by a flange-type union. More or fewer holes and connectors may be provided depending upon the size of the union between the components and the pressures for which the union will be rated. Typically, the union faces will be provided with a metal seal which is disposed in a groove extending around the primary conduit. A seal is generally required to avoid leakage at the union faces.

Offset cross junctions 120 also are provided with a pair of bores which provide conduits for feeding discharge from an individual pump 10 into the primary bore. The feed bores extend perpendicularly from opposing flat union faces on offset cross junctions 120 and lead into and intersect with the main bore. It will be noted that the feed bores intersect with the main bore at right angles, but they intersect at junctions which are offset along the length of the primary bore. Offsetting the junctions between the feed bores and the primary bore will help to minimize areas of concentrated erosion in cross junctions 120.

Like the primary union faces, the feed union faces on cross junctions 120 comprise a plurality of holes accommodating threaded connectors and a metal seal disposed in an annular recess. The feed union faces, for example, allow discharge lines 12 from pumps 10 (not shown in FIGS. 3-4) to be connected to cross junctions 120.

Offset cross junctions 120a-120f are joined by spools 30a-30e. Spools 30 are conventional spools. As such they comprise a pipe which provides a conduit for conveying fluid between fittings in flow line 100, such as between cross junctions 120 and between subassembly 101 and cross junctions 20. A pair of flanges are provided at each end of the pipe. The outward flat surfaces of the flanges provide union faces. Each of the flanges is provided with, for example, 16 bolt holes extending through the flanges. The holes are adapted to accommodate the passage of threaded connectors, such as threaded studs or bolts. The holes allow spools 30 to be joined, for example, to cross junctions 120 in flow line 100. The flanges also are provided with a metal seal. The union faces on spools 30, however, may be varied as desired in accordance with common practice in the art.

Offset cross junctions 120a-120f and spools 30a-30e may be viewed as a subassembly 113 of flow line 100. Though not shown in FIGS. 3-4 for the sake of simplification, it will be appreciated that flowline segment 113 typically will be mounted on a skid or trailer as part of frac manifold 109. Frac manifold 109 also may include at least one low-pressure line 8, to which will be connected low-pressure suction hoses 11 for feeding slurry to pumps 10.

Discharge lines 12 of pumps 10 feed into flowline segment 113 of frac manifold 109. They may be connected to offset cross junctions 120 by various conventional unions. Discharge lines 12 may terminate in a flanged sub allowing them to be connected directly to cross junctions 120 at the feed union faces. Alternately, a flanged, female sub 71 of a hammer union may be connected to the feed union faces as shown in FIGS. 3-4. Discharge lines 12 of pumps 10 then may be connected to cross junctions 120 by hammer unions.

Thus, in contrast to conventional frac manifold 9, which has two relatively small manifolding missiles 13 which themselves are manifolded, novel frac manifold 109 comprises a single, larger, straight segment 113 of flowline 100 which receives the discharge from all pumps 10. That is, in conventional frac systems, such as those shown in FIG. 1, pumps 10 will be lined up on both sides of frac manifold 9. Pumps 10 on one side of frac manifold 9, as represented schematically in FIG. 1, typically will feed into the missile 13 running along that side of frac manifold 9. Pumps 10 which are lined up on the other side will feed into the missile 13 running on the other side of frac manifold 9. Missiles 13 are manifolded by a section of pipe which connects their downstream ends at right angles. The combined discharge from missiles 13 then is distributed into four high-pressure flow lines 14 which run to goat head 15.

As shown schematically in FIG. 2, pumps 10 from both sides of frac manifold 109 all feed into flowline segment 113. Offset cross junctions 120 allow two pumps 10 to feed into flow line 100 from opposite sides of flowline 100. Frac manifold 109, therefore, will have a simpler, less cluttered design. It may be assembled more easily, and when in service, will allow greater access to manifold components for hook up and service. More importantly, however, novel frac manifolds incorporating a single, larger flow line section, such as segment 113, should provide better wear resistance and a longer service life than conventional frac manifolds incorporating multiple missiles.

That is, the slurry flowing through flow lines is highly abrasive and corrosive, moves at relatively high velocities under high pressure, and is quite turbulent in many areas. Consequently, flowline components tend to suffer material loss which can weaken the part and shorten its service life. The material loss results from a number of different dynamics, including ductile erosion and brittle erosion, both of which are exacerbated by corrosion.

Ductile erosion results from entrained sand and other particles dragging along the inner walls and cutting or ploughing into the walls. The angle of impingement typically is small, less than 30°. Ductile erosion is the primary dynamic in relatively straight sections of flow lines. Brittle erosion results from entrained sand impinging on the walls at near normal to the surface, the impact causing tiny radial cracks in the wall. Brittle erosion is the primary dynamic in turbulent areas of the flow line or where the flow line changes direction.

It also will be appreciated that corrosion generally tends to weaken material in the part. The part, therefore, is more susceptible to both ductile and brittle erosion. Moreover, since flowline components typically are manufactured from relatively hard steels, brittle erosion from near normal impacts caused by more turbulent flow typically plays a larger role than ductile erosion resulting from more laminar flow.

For example, turbulence and brittle erosion is the primary dynamic in the area where pump discharge lines 12 feed into missiles 13 of conventional frac manifold 9. Fluid from discharge lines 12 immediately hits the other side of missile 13, which is only a few inches away. More specifically, the inner diameter of high-pressure missiles in conventional frac manifolds typically will be sized such that they cumulatively provide the required flow rates (up to 100 bbl/minute) without excessively high fluid velocity through the missiles. The upper limit, often referred to as the erosional fluid velocity, generally is about 40 ft/sec. Thus, missiles in conventional frac manifolds typically will be made up from 3" or 4" components having, respectively, inner diameters of 2.75" and 3.5".

In contrast, novel flow lines having comparable flow rates and velocities will incorporate 5⅛" or 7 1/16" components having, respectively, inner diameters of 5.13" and 7.06". Thus, for example in novel flowline segment 113, it will be appreciated that fluid entering primary bore 122 of offset cross junctions 120 from feed bores 126 will have more room to spread. The quantity and velocity of particles impinging on the other side of primary bore 122 at near normal angles will be less than experienced by smaller diameter pipes, such as missiles 13 in conventional frac manifold 9.

Moreover, offsetting the junctions between the feed bores and the primary bore will help to minimize areas of concentrated turbulence and erosion in cross junctions 120. Turbulence created by fluid entering the primary bore from an upstream feed bore will tend to diminish, and the flow will become more laminar as fluid travels down the primary bore. The feed bores, therefore, preferably are spaced at sufficient distances to allow turbulence to substantially subside. For example, the feed bores may be offset a distance at least approximately equal to the diameter of the feed bores, and more preferably, at a multiple thereof. The feed bores as illustrated in FIGS. 3-4, for example, are offset by a factor of approximately 7 relative to their diameters.

Finally, frac manifolds usually are mounted on a skid or trailer so that they may be transported easily to and from a well site. That is a significant advantage. The need to transport the manifold over roads and highways without special permits, however, limits the size of the skid or trailer platform and can create significant spatial constraints in the design and layout of the manifold. Frac manifolds having two or more missiles, such as frac manifold 9, require very sharp turns in the flow line and often more junctions. For example, each missile typically will make a right turn, or it will tee into a manifolding pipe. Such turns and junctions are particularly susceptible to erosion. They are eliminated in the novel flow lines, such as flowline segment 113, which provide a single straight flow line accepting discharge from both sides of the segment.

While offset cross junctions 120 of flowline segment 113 provide many advantages, it will be appreciated that other junctions accepting feed from two or more pumps may be incorporated into the novel flow lines. For example, any of the various cross junctions disclosed in applicant's pending application Ser. No. 15/399,102, filed Jan. 5, 2017, and entitled High Pressure Flow Line, may be used. The disclosure of the '102 application is incorporated herein in its entirety by this reference thereto.

The portion of flow line 100 extending from offset cross junction 120*f* to well head 17 may be viewed as a subassembly 114. Flowline segment 114, as illustrated, may incorporate additional or fewer spools 30 of varying lengths running from flowline segment 113 to make up the distance between frac manifold 109 and junction 115 of zipper manifold 16. The novel flow lines also may incorporate other conventional flow line components, units, and subassemblies. For example, flowline segment 114 incorporates cross junctions 20. Cross junctions 20 may be used to allow additional flowline components or segments to be added, such as pressure relief valves or bleed-off lines. The novel flow lines also may incorporate, for example, gauges and other monitoring equipment, as well as control devices such as shut off, plug, check, throttle, pressure release, butterfly, and choke valves. For example, flow line 100 is provided with valves 50 and 51. Valve 50 is a conventional manual gate valve. Valve 51 is a conventional hydraulic valve which may be controlled remotely.

Flow lines necessarily must change course as flow is split or combined. Ideally, however, those portions of a flow line extending between junction fittings, would extend in a straight line. Unfortunately, that rarely, if ever, is possible. For example, as best appreciated from FIGS. 3-4, in flowline 100 junctions 120 are all aligned and extend in a straight line along the y-axis. Junctions 120, however, are not aligned with well head tee connector 60, which has a union face oriented more or less perpendicular to the x-axis. It also is rarely practical to position pumping units 10, frac manifold 113, and other frac equipment such that they are aligned. There is a large amount of equipment at a well site, especially during fracturing operations. The flow line must be able to accommodate whatever spatial constraints are present at a site.

Thus, as discussed further below, the novel flow lines may incorporate various combinations of the novel rotatable components to change the direction or course of the flow line as required for a specific well site. For example, as shown in FIGS. 3-4, flow line 100 runs straight along (i.e., parallel to) they-axis between offset cross junction 120*a* and offset cross junction 120*f*. The heading of flow line 100 may be changed by incorporating various combinations of rotatable elbows 140. Specifically, 4-axis swivel joint 101, 3-axis swivel joint 102, and rotatable elbow 140*f* have been used to provide changes in the heading of flow line 100 to accommodate the position of frac manifold 109 relative to well head 17.

Figure 5:
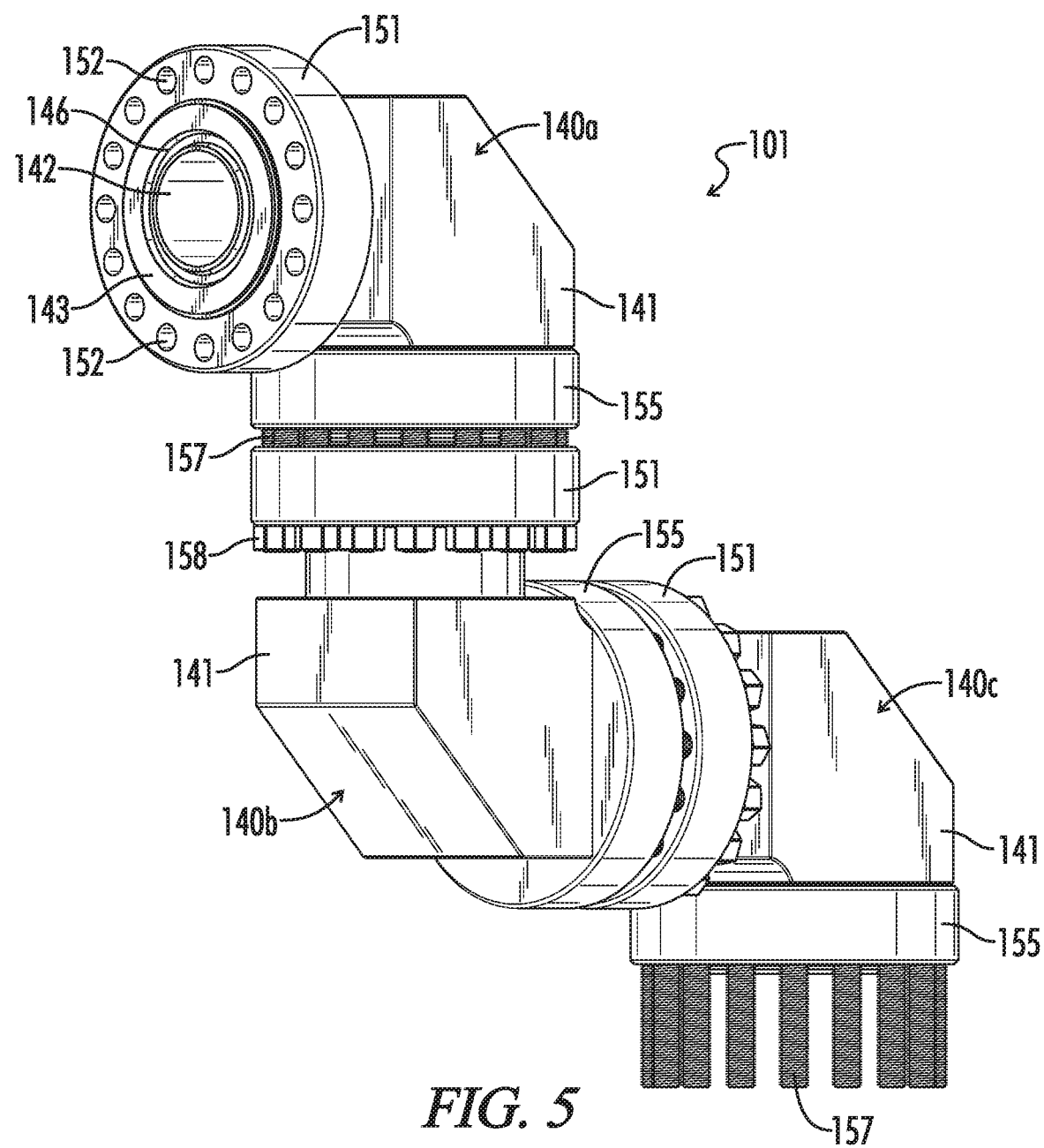
FIG. 5 is an isometric view of a 4-axis swivel joint 101 assembled from three rotatable elbow fittings 140 and incorporated into flow line 100.
Figure 6:
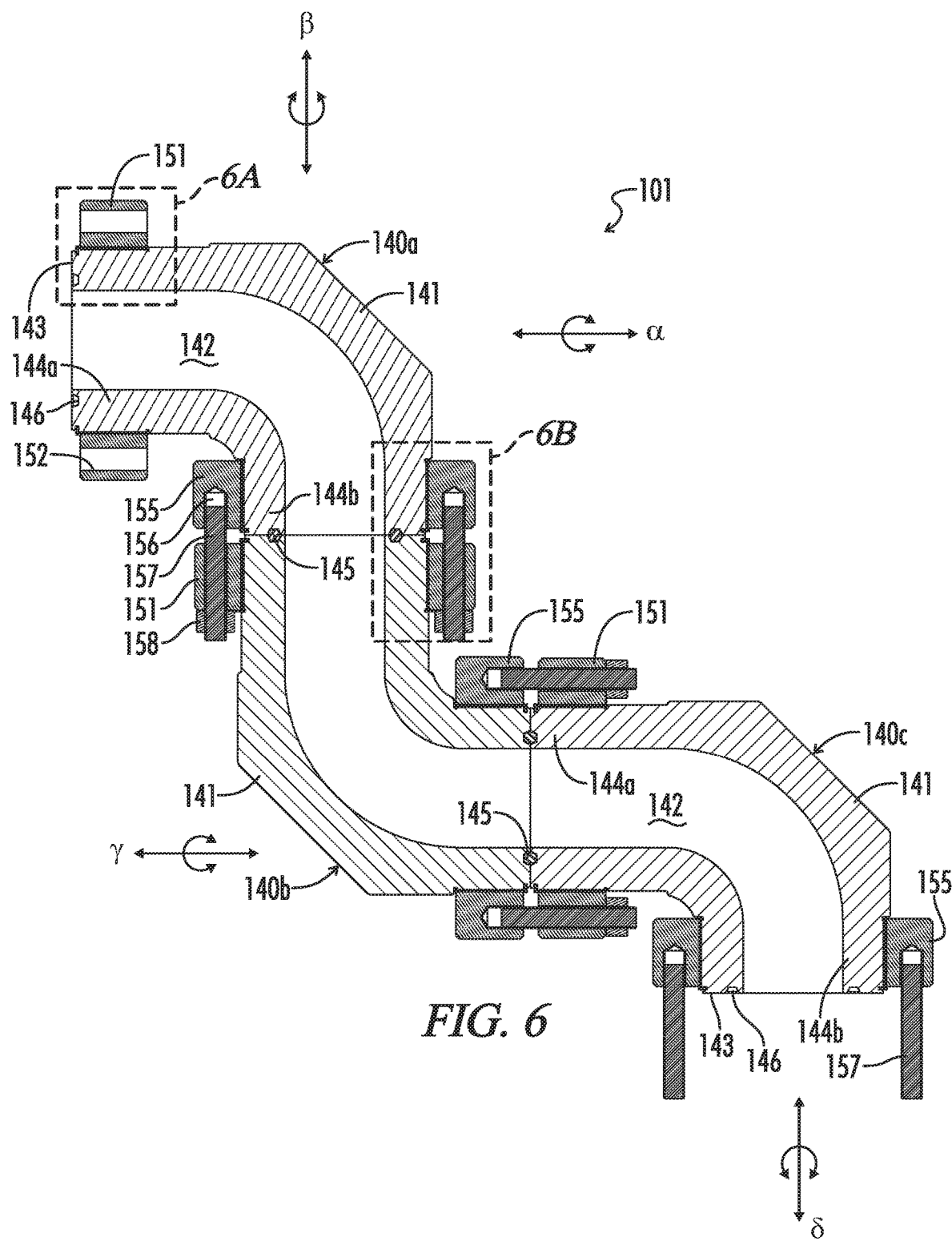
FIG. 6 is a cross-sectional view of swivel joint 101 shown in FIG. 5.
Figure 6A:
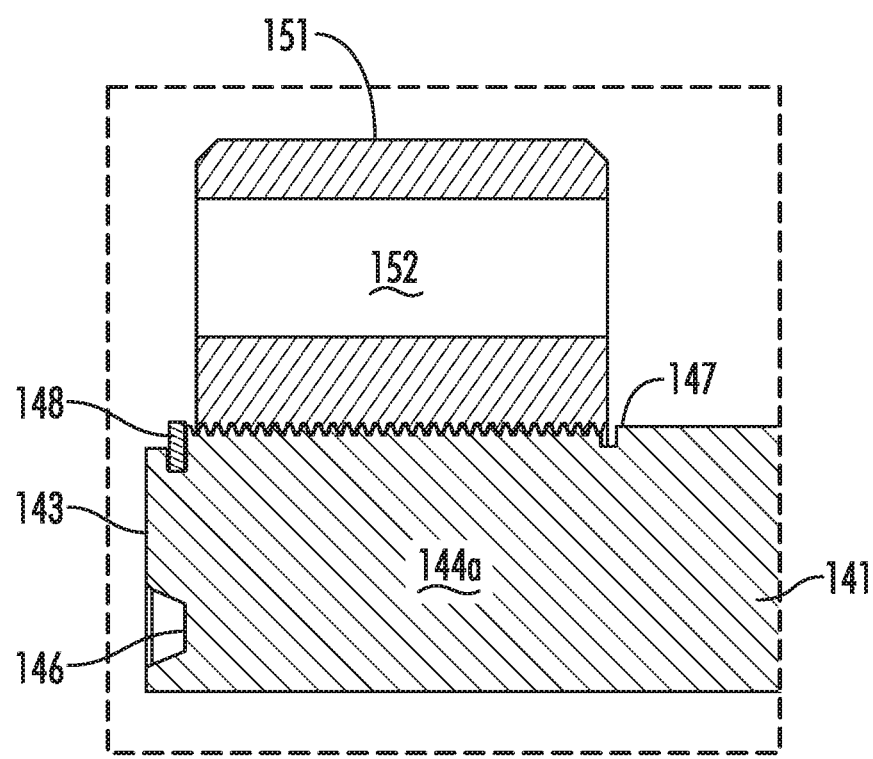
FIG. 6A is an enlarged cross-sectional view of swivel joint 101 taken generally in area 6A of FIG. 6.
Figure 6B:
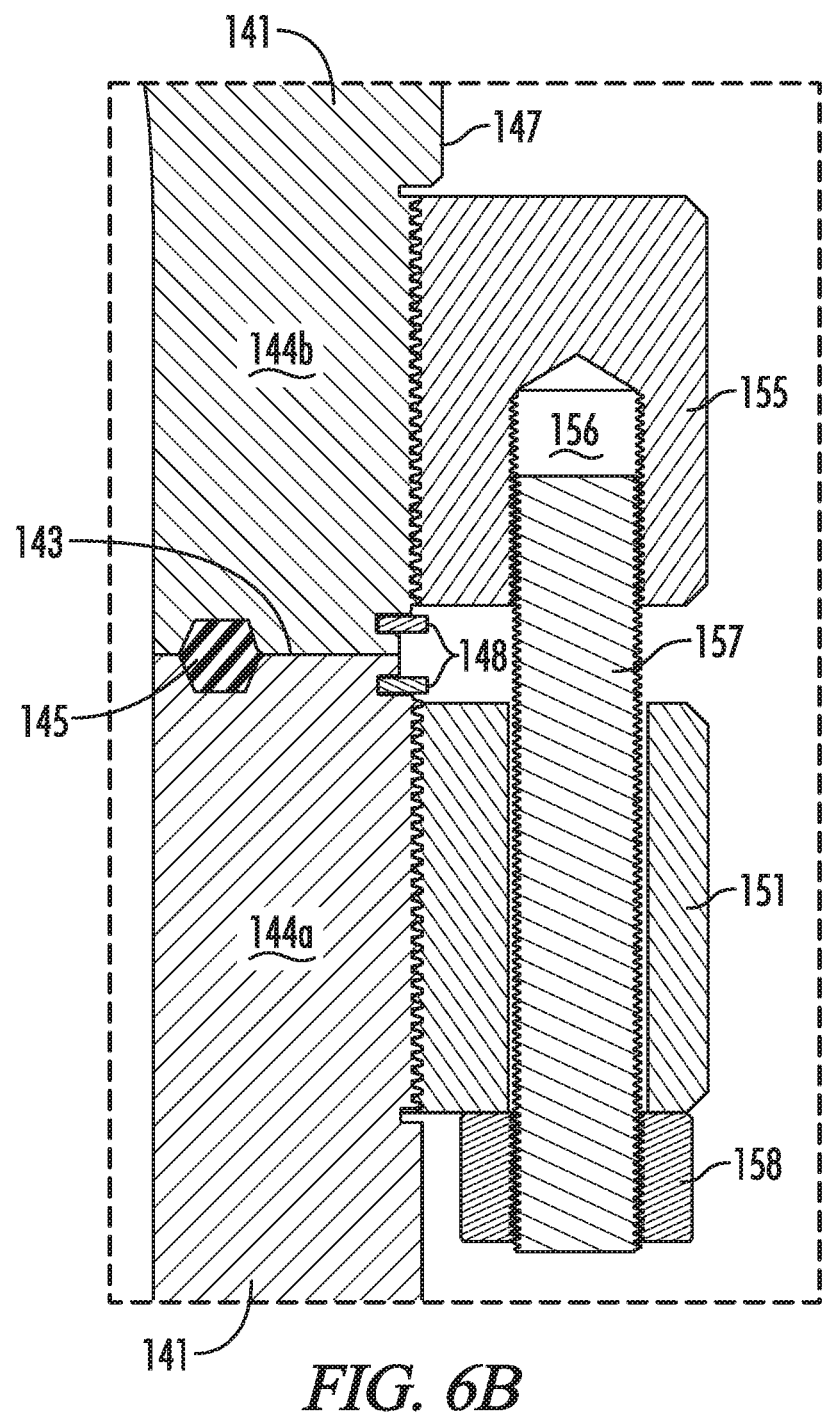
FIG. 6B is an enlarge cross-sectional view of swivel joint 101 taken generally in the area of FIG. 6B of FIG. 6.

Swivel joint 101 and rotatable elbows 140 are shown in greater detail in FIGS. 5-6. As seen therein, swivel joint 101 comprises three rotatable elbows 140*a*, 140*b*, and 140*c*, each of which generally comprises a body 141 and two flanges 151 and 155. Body 141 of rotatable elbows 140 is shaped generally like a truncated or beveled cuboid or a trapezoidal prism. It has a pair of generally cylindrical ends 144 between which extends a bore 142. Bore 142 provides the primary conduit through which slurry passes as it is conveyed towards well head 17. Bore 142 has a generally cylindrical cross-section and is generally centrally situated within body 141. It extends perpendicularly inward from two, mutually perpendicular, flat surfaces or union faces 143. Bore 142 thus incorporates a "long sweep" 90° turn.

Flanges 151 and 155 are rotatably mounted, respectively, on ends 144*a* and 144*b* of rotatable elbows 140. More specifically, flanges 151 and 155 are generally disc shaped components having a central hole, giving them the shape of a toroid. The central hole is large relative to the diameter of flanges 151 and 155. Internal threads on the central hole of flanges 151 and 155 engage external threads on ends 144. The threads may be, for example, 6 pitch ACME threads, but other conventional thread designs may be adapted for use in the novel fittings. In any event, the threaded engagement allows rotation between flanges 151 and 155 and body 141 about a central axis normal to their respective union faces 143. Thus, elbow 140 may be rotated to any degree relative to an adjacent flowline component. That is, elbow 140 may provide a 90° turn to the left, to the right, or at any angle relative to the adjacent component.

Rotatable elbows 140 are adapted for assembly to other flowline components by flange-type unions. Thus, as appreciated from FIGS. 5-6, union faces 143 are provided on each end 144 of rotatable elbows 140. Union faces 143 extend around the periphery of the openings of bore 142. They provide substantially flat bearing surfaces upon which the union will be loaded. Typically, union faces 143 will be provided with a metal seal 145 which is disposed in an annular groove 146. Metal seals 145 preferably will be releasably retained in annular groove 146 by grease or by dowel pins extending through seals 145 and into groove 146.

Though described as "flat" herein and appearing to the casual observers as such, the union faces of conventional flange unions may have a very shallow annular boss on the union face. For example, the flanges on a spool typically will have a shallow annular boss extending around the conduit opening. The annular groove in which the metal seal is carried will be provided in the annular boss. The boss will help ensure that the abutment between mating union faces is properly loaded when the union is made up. The designs and features of union faces in particular and flange unions in general are well known, and the union faces on rotatable elbow 140 and the other novel rotatable flanged components may be varied in accordance with common practice in the art.

Flange 155 is provided with, for example, 16 bottomed holes 156 which are arrayed angularly around flange 155. Holes 156 are adapted to receive, for example, threaded studs 157, or standing bolts, standard single-end threaded bolts with a head, double-end threaded bolts, or other threaded connectors. Flange 151 is provided with, for example, 16 bolt holes 152 which are arrayed angularly around and extend through flange 151. Bolt holes 152 are adapted to accommodate the passage of threaded connectors, such as threaded studs 157 on flange 155. It will be appreciated, of course, that union faces 143 on elbows 140 may be varied as desired in accordance with common practice in the art. More or fewer holes 152 and connectors 157 may be provided depending upon the size of the union between the components and the pressures for which the union will be rated.

In any event, flanges 151 and 155 allow a rotatable, flange-type union to be made up between rotatable elbows 140. As will be appreciated from FIGS. 5-6, elbows 140*a* and 140*b* may be joined by passing threaded studs 157 on flange 155 of elbow 140*a* through openings 152 on flange 151 of elbow 140*b*. Flanges 155 and 151 will be secured, and a load applied to union faces 143 by tightening nuts 158 on studs 157. Elbows 140*b* and 140*c* are joined in a similar fashion.

Prior to loading the unions, however, flanges 151 and 155 allow elbows 140 to be rotated to any degree relative to each other or to other flowline components to which they are joined. For example, as shown in FIGS. 5-6, each elbow 140 in swivel joint 101 provides a 90° turn. Because flanges 151 and 155 are rotatably mounted on elbows 140, however, swivel joint 101 is provided with four axes of rotation α, β, γ, and δ. The elbows 140, therefore, can be joined to provide a 90° turn at any angle about each of those 4 axes.

Moreover, by using various combinations of the novel rotatable elbows, and by selectively rotating them relative to each other and the other flowline components, the novel rotatable elbows may be used to assemble a flow line between any two essentially fixed junctions. The rotatable flowline components of the subject invention will allow greater control over the angular alignment of components in a flowline and, therefore, over the direction (or heading) and course (or track) of a flowline. Referring to FIGS. 3-4, for example, flowline 113 and well head 17 are not aligned. Flowline 113 has a heading along the y-axis, while well head 17 must be joined along the x-axis. Flowline 113 preferably will be mounted on skid or trailer (not shown in FIGS. 3-4), and therefore typically will be elevated somewhat from ground level. Tee junction 60 of well head 17, however, is located at an elevation above flowline 113. Four-axis swivel joint 101, 3-axis swivel joint 102, and rotatable elbow 140f have been used to provide changes in the heading of flow line 100 to accommodate the position of frac manifold 109 relative to well head 17.

More particularly, elbow 140a is joined to the end of segment 113 and has been rotated at flange 151 about the α-axis of swivel joint 101. Elbow 140a thus provides a 90° turn in flowline segment 114 which veers down and to the left of the y-axis heading of flowline segment 113. Elbow 140b, which is joined to elbow 140a, has been rotated along the β-axis of swivel joint 101. Elbow 140b provides another 90° turn, but flowline segment 114 heads horizontally again, and in a heading further off the y-axis. Elbow 140c, which is joined to elbow 140b, has been rotated along the γ-axis of swivel joint 101. Spools 30f, 30g, and 30h, and flowline segment 114 now have a horizontal heading below (for example, proximate to ground level). They also angle off to the right of the original y-axis heading of flowline segment 113.

Swivel joint 102 and rotatable elbow 140f are assembled downline in flowline segment 114. Swivel joint 102 comprises a pair of rotatable elbows 140d and 140e which have three axes of rotation. Swivel joint 102 and elbow 140f offset and elevate the heading of flowline segment 114 such that it approaches and is joined to well head 17 at an elevation well above ground level and the level of flowline segment 113. Flowline 114 also approaches well head 17 along a heading more or less along the x-axis.

It will be appreciated that conventional flanged components have been used to provide relative rotation between the components and some degree of control in the heading and track of a flowline. Relative rotation can be achieved simply by rotating the array of bolts or array of holes on one of the components relative to its "normal" position. For example, if a component has 16 studs passing through 16 holes on the flange of an adjacent component, the component may be rotated from its "normal" orientation before inserting the studs through the openings. The studs and flange are fixed relative to their respective components. Thus, the component may be rotated only in increments of 22.5°, the angular spacing of the studs and holes. The novel components, however, allow continuous relative rotation to any desired degree simply by rotating the flange relative to the rest of the component. They are not limited by the angular separation of the threaded connectors and holes.

The novel rotatable flowline components also may be provided with features which will limit rotation of the flanges on the body of the component. For example, rotatable elbows 140 are provided with low shoulders 147 which are inward of flanges 151 and 155. Shoulders 147 provides a stop against travel of flanges 151 and 155 onto body 142 of elbow 140. Retainers, such as snap rings 148, are provided in grooves axially outward of flanges 151 and 155. Snap rings 148 provide stops against travel of flanges 151 and 155 off ends 144 of elbow 140. Other conventional components and features, however, may be used to limit travel of flanges 151 and 155.

It also will be appreciated that flanges 151 and 155 will be threaded onto ends 144, and snap ring 148 will be sufficiently inward along ends 144 such that the outward face of flanges 151 and 155 will be inward of union faces 143. That will help ensure that the abutment between mating union faces 143 is properly loaded when the union is made up.

Otherwise, the pitch and extent of the threads, and the location of shoulders 147 and snap rings 148 preferably are coordinated to provide approximately 360° of relative rotation, or less, while still allowing full engagement between the threads on flanges 151 and 155 and those on ends 144 when a union is made up. In theory, the extent of rotation need only be more or less equal to the angular spacing between holes 152 and studs 157 to provide any desired degree of rotation between elbow 140 and an adjacent flanged component. Some greater degree of rotation will allow greater flexibility in making up unions, however, without withdrawing and realigning studs 157 and holes 152.

In any event, flanges 151 and 155 will be provided with a degree of rotation sufficient to allow a union to be made up easily at any angle, while allowing them to efficiently transfer load to union faces 143 through the threads. Moreover, by providing such stops, flanges 151 and 155 may be mounted on elbows 140 prior to shipment so that assembly of a flow line on site is expedited.

Though the course of a particular flow line will vary greatly depending on the equipment used and the well site, it also will be appreciated that the novel flow lines may provide a single, relatively large flowline over much of the high-pressure side of a frac system. Flow line 100, for example, runs from pump discharges lines 12 all the way to well head 17. Such flow lines offer various advantages.

First, the overall layout at a well site is greatly simplified. Simplification of the frac system can create space to access other portions of the system and reduce confusion among workers at the site. Moreover, by replacing multiple lines with a single line, the total number of components in the system may be reduced. Fewer components mean fewer junctions and fewer potential leak and failure points in the system. Fewer components also means less assembly time at a well site.

Second, exposed elastomeric seals are a potential source of leaks. They also increase turbulence through a conduit and, therefore, erosion resulting from the flow of abrasive slurry through the flow line. The novel rotatable flowline components are assembled using flange-type unions. The unions do not have any exposed elastomeric seals. They have internal metal seals situated between the union faces. Preferably, the entire flow line is assembled using flange unions, and will not have any exposed elastomeric seals other than those that necessarily may be present in components such as control valves.

It will be noted in particular that preferred flow lines, such as flow line 100, are able to accommodate changes in direction without using conventional swivel joints. Swivel joints are expensive. They incorporate elastomeric seals and packings. They also have sharp turns which are particularly susceptible to erosion. Moreover, they are particularly susceptible to bending stress caused by vibrations in the flow line. Such strain can lead to failure. In any event, it means that swivel joints have a relatively shorter service life than many flow line components. Thus, swivel joints not only are a big component of the overall cost of a flow line, but they are a primary source of potential leaks and failure.

The relatively large inner diameter of the novel flowlines such as flow line 100 can help minimize erosion and failure in other ways. As the diameter of a conduit increases, drag on the fluid passing through the conduit increases, but not as rapidly as the volume of fluid. Thus, proportionally there is less drag, and flow through the conduit is more laminar. Moreover, by replacing multiple smaller lines with a single larger line, overall drag on fluid conveyed through the system is reduced. For example, a single 7 1/16 line may replace six 3" lines. The drag through the larger line will be less than half the cumulative drag through the six smaller lines. More importantly, less drag means less erosion.

It will be appreciated that the illustrated fittings have been described as having a prismatic shape, or as cuboid, solid-rectangular and the like except in regard to their cylindrically shaped ends. Such geometric terms as used herein are intended to describe generally, the shape of such block fittings and to distinguish them from fittings which have a pipe-like or generally cylindrical body. The terms are not intended to be limited to the precise geometric definitions. For example, such components would never be manufactured without rounds along the edges. The precise shape may be varied consistent with the purposes described herein.

At the same time, however, various advantages are provided by block-like bodies. Such bodies can provide more material in areas which are particularly susceptible to erosion, such as in the bend area of elbows 140 and 240. Rotatable elbows 140 and 240 also may be more suitable for large diameter, single flow-line swivel joints than conventional swivel joint designs. A "long sweep" turn may be machined into the block more easily than bending a large-diameter pipe and can be made with a shorter bend radius. It also will be appreciated, however, that the novel fittings may be provided with a short-sweep conduit simply by drilling holes from each end to an intersection point within the fitting body.

Figure 7:
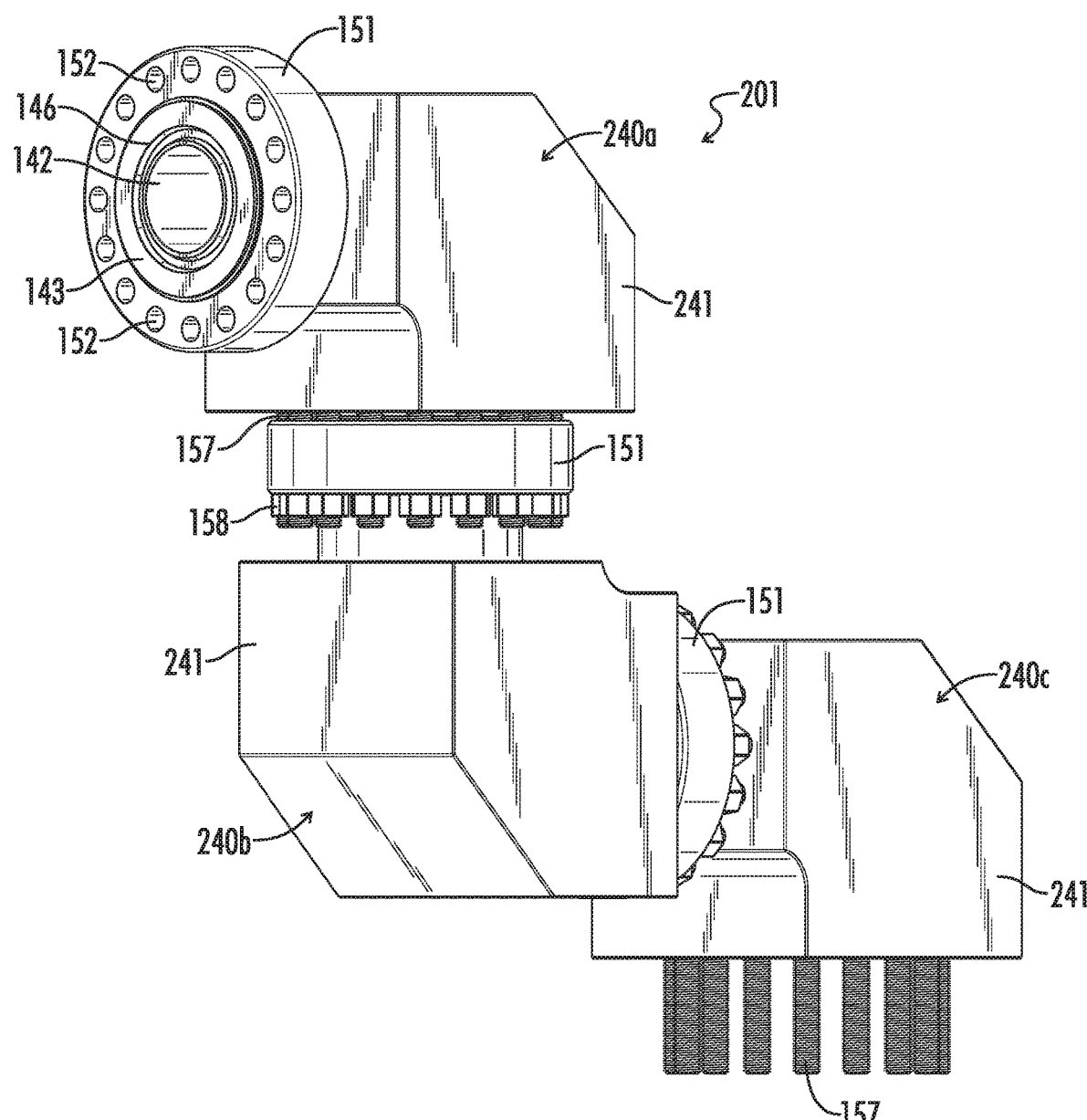
FIG. 7 is an isometric view of a 3-axis swivel joint 201 assembled from three second embodiments 240 of the rotatable flowline components of the subject invention, which second embodiment 240 is a rotatable elbow fitting.
Figure 8:
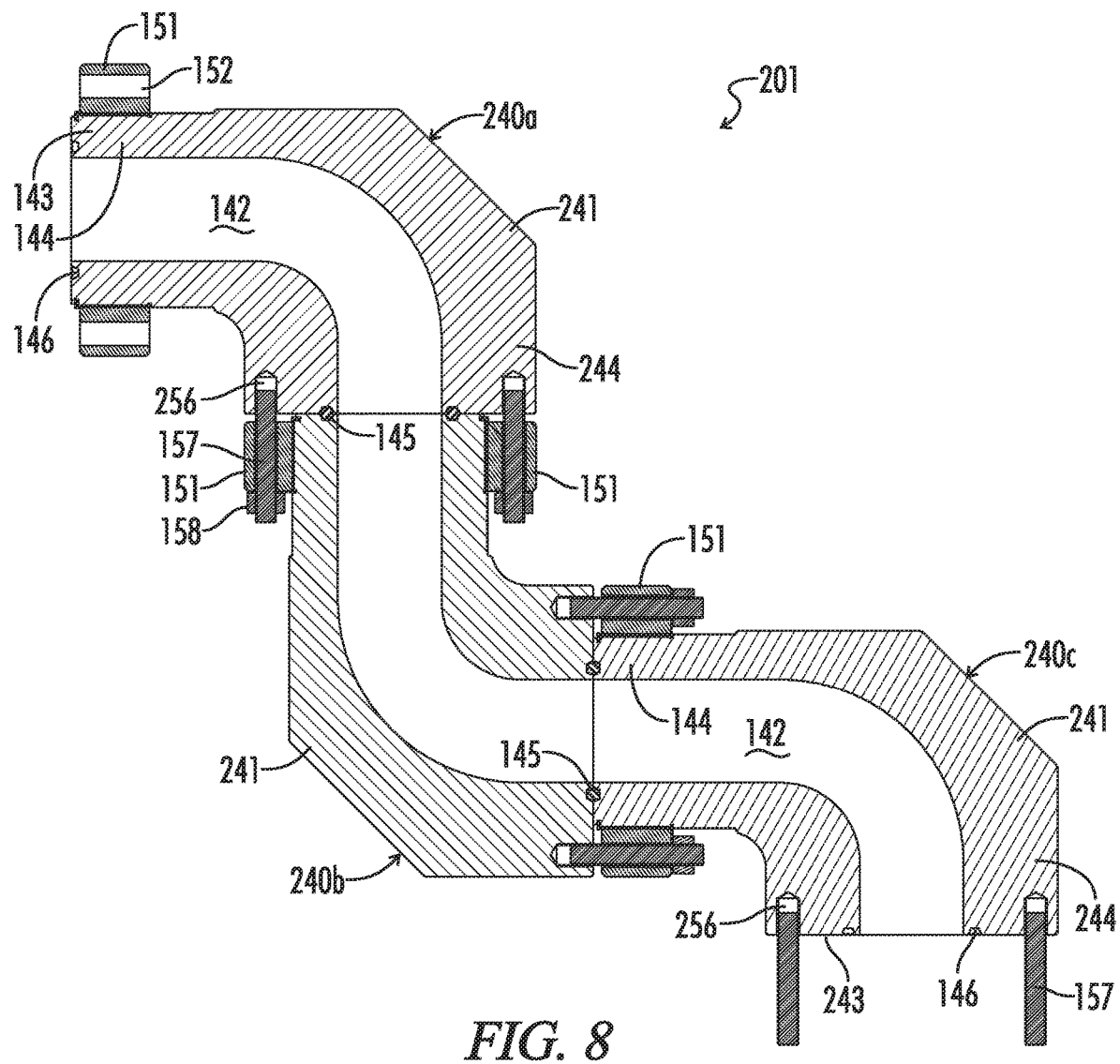
FIG. 8 is a cross-sectional view of swivel joint 201 shown in FIG. 7.

A second preferred swivel joint subassembly 201, which incorporates second preferred embodiments 240 of the novel rotatable flowline components, is shown in FIGS. 7-8. As shown therein, swivel joint 201 comprises three rotatable elbows 240. Rotatable elbows 240 are substantially similar to rotatable elbows 140 except that elbows 240 do not incorporate a pair of rotatable flanges. Elbows 240 have a single rotatable flange 151 mounted on a threaded end 144 of elbow body 241. The other end 244 of elbow body 241 is provided with bottomed holes 256 arrayed angularly around the opening of bore 142 and union face 243. Threaded studs 157 are mounted in bottomed holes 256 in end 244 instead of on a rotatable flange, such as flange 155 in elbow 140. While elbows 240 may be rotated only at one end 144, and swivel joint 201 thus is provided with only three axes of rotation, it will be appreciated that elbows 240 provide similar flexibility in providing a flow line with changes in heading and course.

Figure 9:
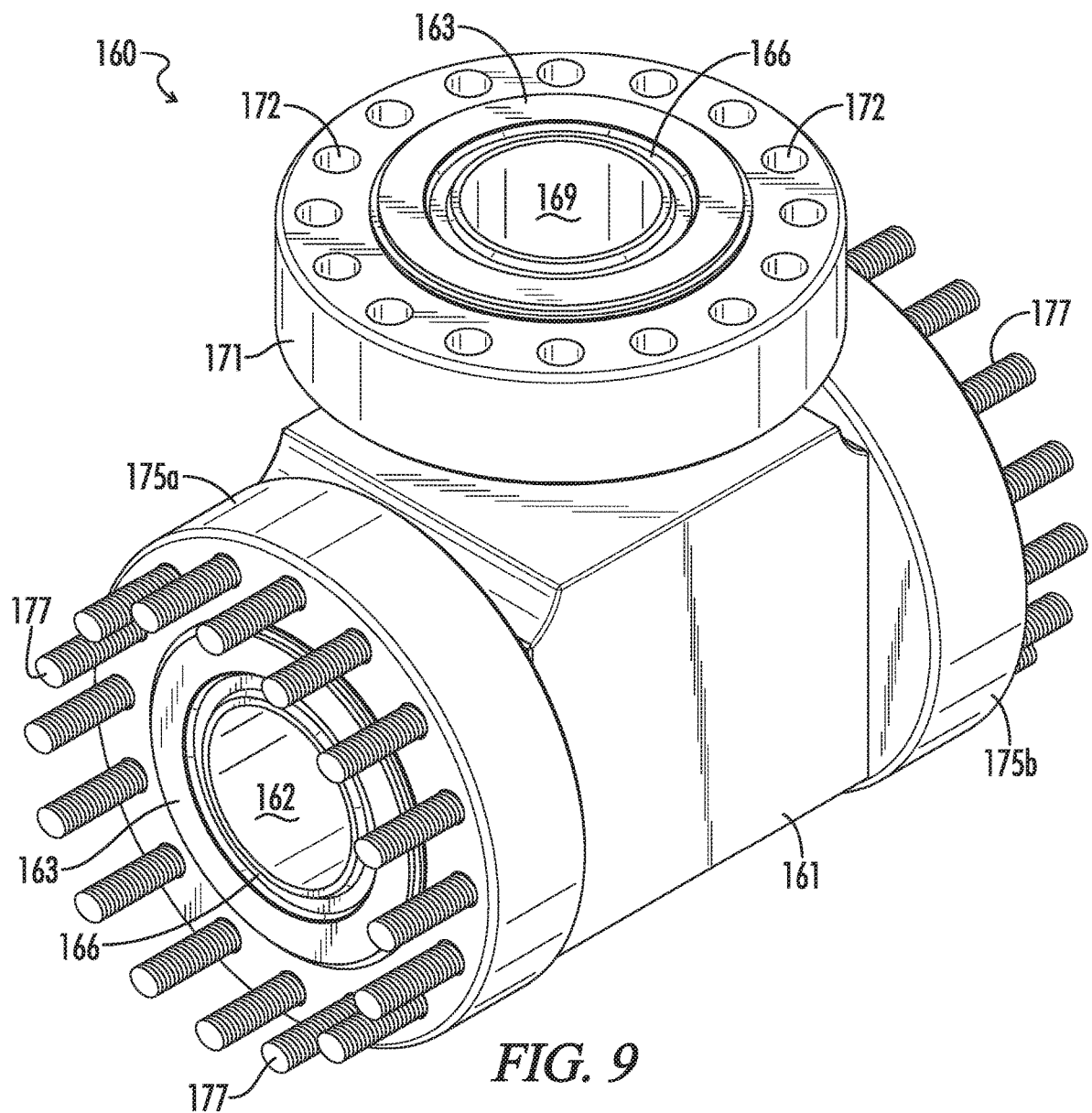
FIG. 9 is an isometric view of a third preferred embodiment 160 of the rotatable flowline components of the subject invention, which third embodiment 160 is a rotatable tee junction.
Figure 10:
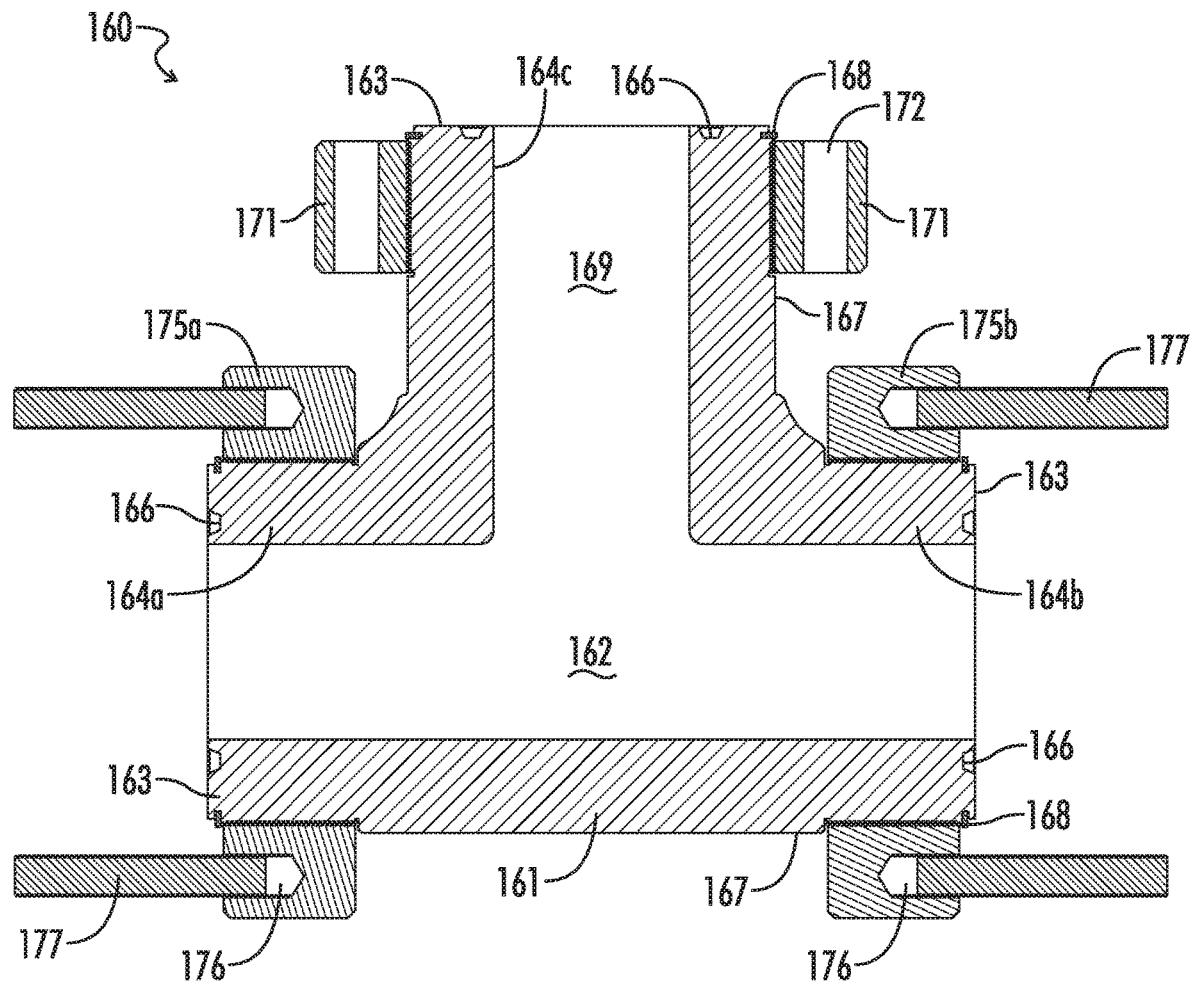
FIG. 10 is a cross-sectional view of rotatable tee junction 160 shown in FIG. 9.

It will be appreciated that the novel rotatable flowline components are not limited to elbows. Other conventional flowline fittings may be provided with rotatable flanges and thus provide flexibility in assembling flowlines. For example, a third preferred embodiment 160 of the novel rotatable flowline components is shown in FIGS. 9-10. As shown therein, embodiment 160 is a tee junction. Tee junction 160 has a body 161 which, like conventional tee junctions, has a main bore 162 into which flows a feed bore 169. Main bore 162 extends between threaded ends 164a and 164b. Feed bore 169 extends into main bore 162 from threaded end 164c. Union faces 163 are provided at each end 164 of tee junction 160.

Tee junction 160 is similar in other respects to elbow 140. A flange 171 is rotatably mounted on threaded end 164c by internal threads provided in a central opening therein. Rotatable flange 171 is provided with bolt holes 172 which are arrayed angularly around flange 171. Flanges 175a and 175b are rotatably mounted, respectively, on threaded ends 164a and 164b by internal threads. Rotatable flanges 175 have bottomed holes 176 in which are mounted threaded connectors, such as threaded studs 177. The extent of rotation between flanges 171 and 175 and body 161 is limited by shoulders 167 and retaining rings 168. Thus, tee junction 160 is able to accommodate flow lines feeding into a main flow line at varying angles, and otherwise to provide varying changes in direction in flow lines by varying the relative rotation between the body of tee junction 160 and flanges 171 and 175.

Figure 11:
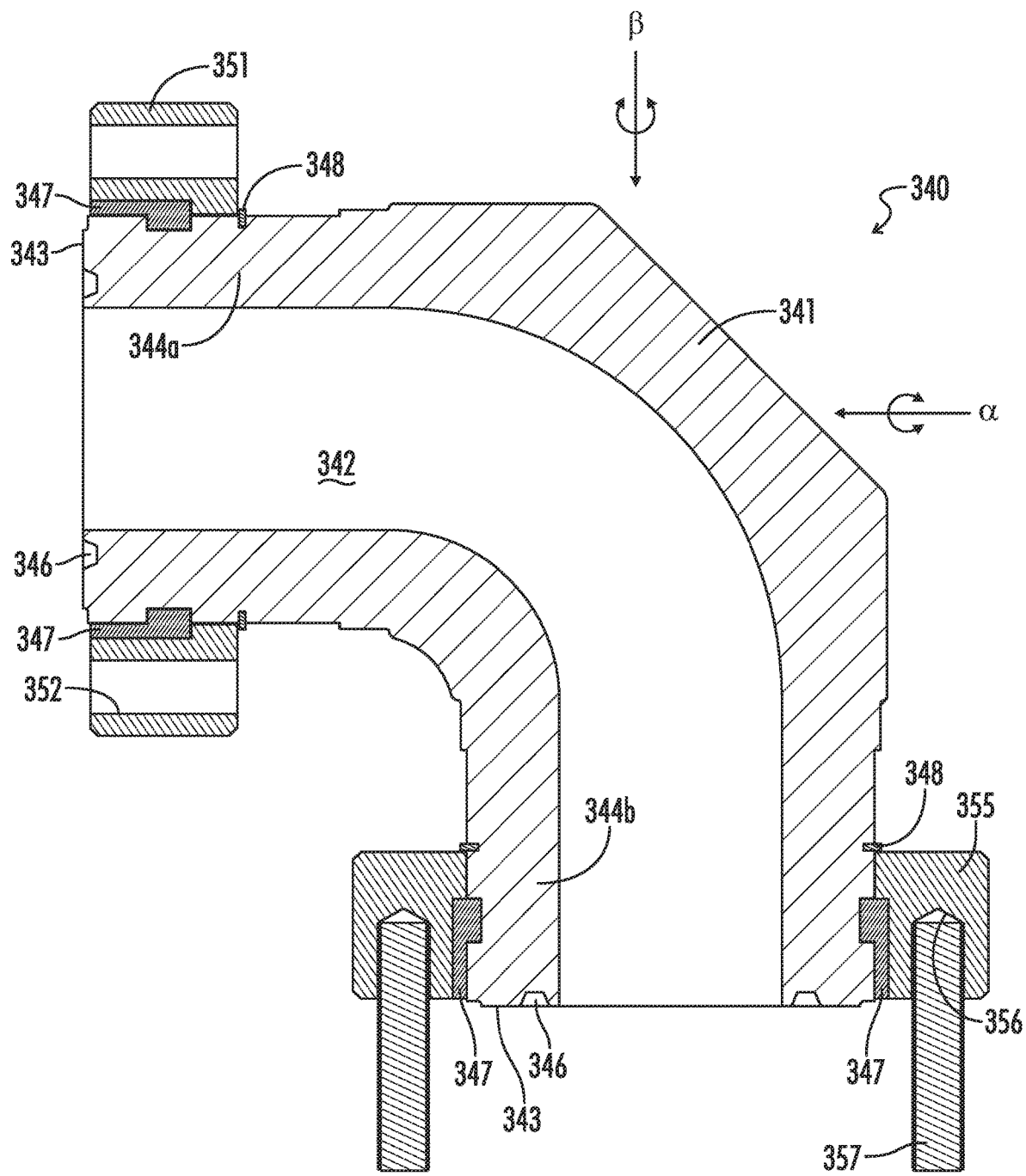
FIG. 11 is a cross-sectional view of a fourth preferred embodiment 340 of the rotatable flowline components of the subject invention, which fourth embodiment 340 is a rotatable elbow fitting.

A third preferred embodiment 340 of the novel rotatable flowline components is shown in FIG. 11. Rotatable elbow 340 is similar to rotatable elbow 140 except in the way in which elbow 340 is designed for rotation. As shown in FIG. 11, rotatable elbow 340 comprises a body 341 and two flanges 351 and 355. Body 341 has a pair of generally cylindrical ends 344 between which extends a bore 342. Bore 342 incorporates a long sweep 90° turn. Ends 344 of body 341 are provided with union faces 343. Union faces 343 extend around the periphery of the openings of bore 342 and provide bearing surfaces upon which the union will be loaded. Typically, union faces 343 will be provided with a metal seal (not shown) which is disposed in an annular groove 346.

Flanges 351 and 355 are rotatably mounted, respectively, on ends 344a and 344b of rotatable elbow 340. Like flanges 151 and 155, flanges 351 and 355 are toroid shaped components. In contrast to flanges 151 and 155 of rotatable elbow 140, however, the central holes of flanges 351 and 355 of rotatable elbow 340 have an area of reduced internal diameter in the inward end of the central hole. That radial profile provides the openings in flanges 351 and 355 with an outward-facing, annular shoulder.

Flanges 351 and 355 are mounted on ends 344 by a plurality of retainer segments 347. Retainer segments 347 are arranged circumferentially around ends 344. Preferably, as shown, they are carried in an external groove in ends 344. As few as two segments may be used, each preferably having a sweep of approximately 180°, but more may be provided if desired. For example, rotatable elbow 340 may incorporate three retainer segments 347 of approximately 120°, or four segments 347 of approximately 90°.

The configuration of retainer segments 347 may be described in general terms as lateral segments of an open, radially profiled cylinder or, more simply as "cylindrical" segments. Each segment 347 has a radially enlarged inward end which is carried in the external groove in ends 344. That radial profile provides an outward-facing shoulder. Segments 347 are arranged side-by-side in the grooves running around ends 344. Thus, retainer segments 347 may be viewed collectively as a segmented collar extending around ends 344 and in the annular groove in the outer circumference thereof.

Rotatable elbows 340 are adapted for assembly to other flowline components by flange-type unions in substantially the same manner as elbows 140 and 240 and tee junction 160. Thus, flanges 351 and 355 are provided, respectively, with holes 352 and threaded studs 357. When the union is made up, for example, by tightening nuts (not shown) on threaded studs 357, the outward-facing shoulder on flanges 351 and 355 will bear on the inward end of segments 347. The outward-facing shoulder on segments 347 will bear on the outward wall of the external groove in ends 344, thus allowing union faces 343 to be loaded with a sealing force.

Prior to loading the unions, however, flanges 351 and 355 may be partially made up and will allow elbow 340 to be rotated to any degree relative to other flowline components to which it is joined. That is, the inner diameter of the enlarged diameter, outward portion of the central hole in flanges 351 and 355 and the outer diameter of the retainer segments 347, and the inner diameter of the reduced diameter, inward portion of the central flange hole and the outer diameter of ends 344 are coordinated such that flanges 351 and 355 can rotate on retainer segments 347 and ends 344. Once the union is loaded, the axial force transmitted through segments 347 will preclude flanges 351 and 355 from rotating. Elbow 340, therefore, can be joined to provide a 90° turn at any angle about either the axis α or axis β.

Flanges 351 and 355 may be mounted on rotatable elbow 340 by slipping them over and inward on their respective ends 344. Retainer segments 347 then may be installed in the external groove on ends 344, and flanges 351 and 355 moved outward over segments 347. Flanges 351 and 355 then are held in position, e.g., by a snap ring 348 which fits into corresponding grooves in ends 344.

In rotatable elbows 140 and 240 and rotatable tee 160, load is transferred directly from their respective flanges to the ends and union faces thereof. In rotatable elbow 340, however, load is transferred from flanges 351 and 355 to ends 344 via retainer segments 347. Segments 347 in essence provide an annular stop around ends 344 of elbow 340. It will be appreciated, therefore, that retainer segments 347 may be configured in diverse ways to provide an equivalent stop, preferably an annular stop extending substantially continuously around ends 344. Similarly, an annular stop may be provided by other components, such as an annular ring threaded on the ends 344 of elbow 340.

It will be appreciated that the terms "inward" and "outward," unless specified otherwise, reference axial location or orientation relative to the ends and unions of the components. For example, the shoulder on retainer segments 347 of rotatable elbow 340 are outward-facing because it faces toward the terminus of ends 344 instead of toward the center of body 341. "Axial," "radial," and forms thereof reference the central axes of the unions. "Inner," "outer," "internal," "external," "inside," "outside," and the like reference to radial location or orientation relative to the central axis of the unions. For example, the grooves on ends 344 in which retainer segments 347 are carried are "external" grooves because they are on the outer surfaces of ends 344 which are further away radially from the central axes of ends 344.

It will be appreciated also by comparing elbow 140, elbow 240, and tee 160 that the novel rotatable flowline components may incorporate various combinations of rotatable flanges. A component may have rotating flanges on only some of its ends. Some or all of the ends may be provided with only "studded" rotatable flanges, such as flange 155, or flanges having bolt holes, such as flange 151. Similarly, any combination of flanges may be rotatably mounted to the ends as may desired. Tee 160, for example, may be instead provided with one studded flange 175 and two flanges 171 having bolt holes.

Moreover, in addition to elbows and tees, other fittings, such as crosses, laterals, and wyes may be provided with rotatable flanges as described herein. The novel fittings also may be used alone, or in combination with other fittings. Similarly, and as an example, swivel joint 101 is assembled from three rotatable elbows 140, but additional elbows 140 may be added to provide additional flexibility. For some applications assemblies of as many as six or more elbows may be useful. Spacer fittings also may be provided between the fittings to extend the course of a swivel joint subassembly.

It will be appreciated the components of high pressure flow lines must be properly aligned in order to ensure a fluid-tight union. Thus, the degree to which rotatable flowline components are rotated must be fairly precise. At the same time, though they are quite heavy and durable, the rotatable components still must be handled with care. Rotation of the components relative to each other can cause scoring and other damage to the bearing surfaces of the union faces upon which the union will be loaded. The metal seals carried on the union faces, such as metal seals 145, also may be damaged.

Thus, rotatable components, such as novel rotatable elbow 140, may be assembled by novel methods that will allow them to be rotated without damaging their union faces or seals. For example, the union between rotatable elbows 140a and 140b of swivel joint 101 shown in FIGS. 5-6 may be made up by first loosely assembling the union to provide clearance between their union faces 143.

As noted, the novel rotatable flowline components may accommodate a variety of threaded connectors, such as standard single-end bolts with a head, double-end threaded bolts, standing bolts, and threaded studs. The novel methods may best be exemplified in the context of a slight modification to rotatable elbows 140. That is, flange 155 of rotatable elbow 140 may be provided with through holes and bolts instead of bottomed holes 156 and threaded studs 157.

So modified, snap ring 148 on elbow 140b may be removed to allow flange 151 to be partially unthreaded from body 141. Flange 151 will be unthreaded to a degree that its outer face extends beyond the plane of union face 143 of elbow 140b and metal seal 145 carried thereon. Rotatable elbows 140a and 140b then may be positioned such that the bolts, such as double-end threaded bolts, may be inserted through flange 155 of elbow 140a and flange 151 of elbow 140b. Nuts then may be threaded onto the ends of the bolts to draw flanges 155 and 151 together.

Flange 151, having been partially unthreaded, will bear on the face of flange 155 of elbow 140a. Thus, flanges 151 and 155 will provide clearance between union face 143 of elbow 140a and union face 143 of elbow 140b and metal seal 145. Though described as "loose" because of the separation between elbows 140 and because there is no load on their union faces, the bolt nuts typically will be tightened sufficiently to eliminate play in the connection between flanges 155 and 151.

When rotatable elbows 140 are thus loosely made up, their respective flanges 155 and 151 are rotationally locked to each other. Bodies 141 of elbows 140a and 140b, however, may be rotated relative to each other about their common axis of rotation, axis β. Thus, rotatable elbows 140 may be positioned relative to each other to provide a 90° turn at whatever angle may be required for the course of the flow line. The clearance between elbows 140a and 140b, however, will prevent damage to their union faces 143 and seal 145 as they are rotated.

Once properly positioned, the bolts may be removed, allowing flange 151 to be threaded fully back onto body 141 of elbow 140b. That is, flange 151 will be threaded so that it once again is within the plane of union face 143 of elbow 140b. Once flange 151 has been withdrawn, the bolts may be reinstalled through flanges 155 and 151, and load may be transferred to union faces 143 to fully make up the union between elbows 140a and 140b. Flanges 151 and 155 have been exemplified as being joined by 16 connectors. While all 16 connectors will be used to make up the union fully, it may not be necessary to install all 16 connectors to loosely make up the union. A fewer number, such as three or four, typically will suffice.

The novel rotatable flowline components also may incorporate separators. The separators will provide separation between the union faces and metal seals of the rotatable flanged components and the union faces of the component to which they will be joined. The separators may be spacer mechanisms, such as lock nuts, grommets, and Belleville washers, bearing mechanisms, such as bearing plates, and other conventional separator mechanisms. The separators will allow the rotatable flowline components to be rotated without damaging their union faces or seals.

Figure 12A:
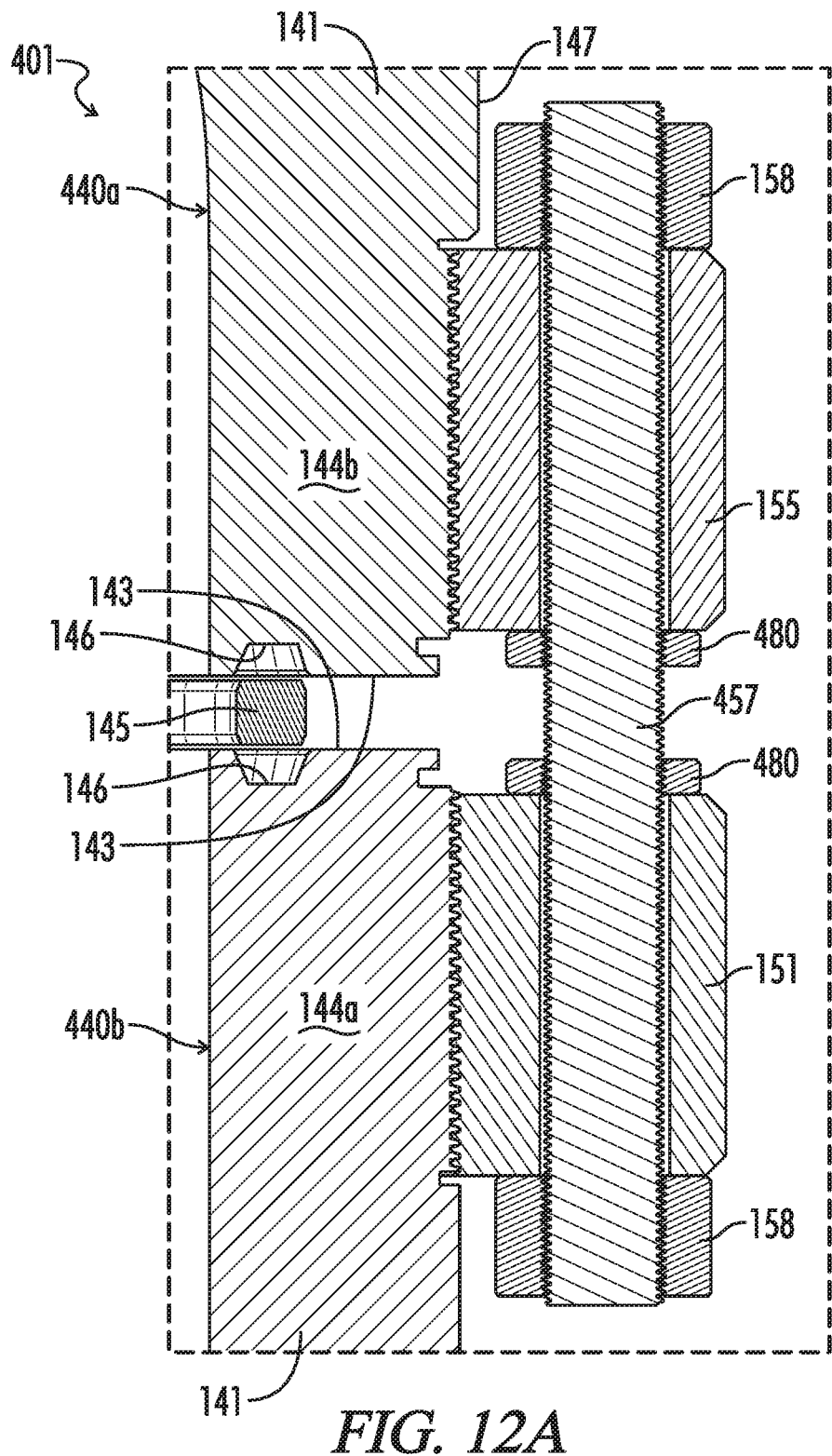
FIGS. 12A and 12B are enlarged, cross-sectional views of an assembly 401 of two fifth preferred embodiments 440 of the rotatable flowline components of the subject invention, which fifth embodiments 440 are rotatable elbow fittings having spacer nuts 480 which assist in making up the union between elbow fittings 440.
Figure 12B:
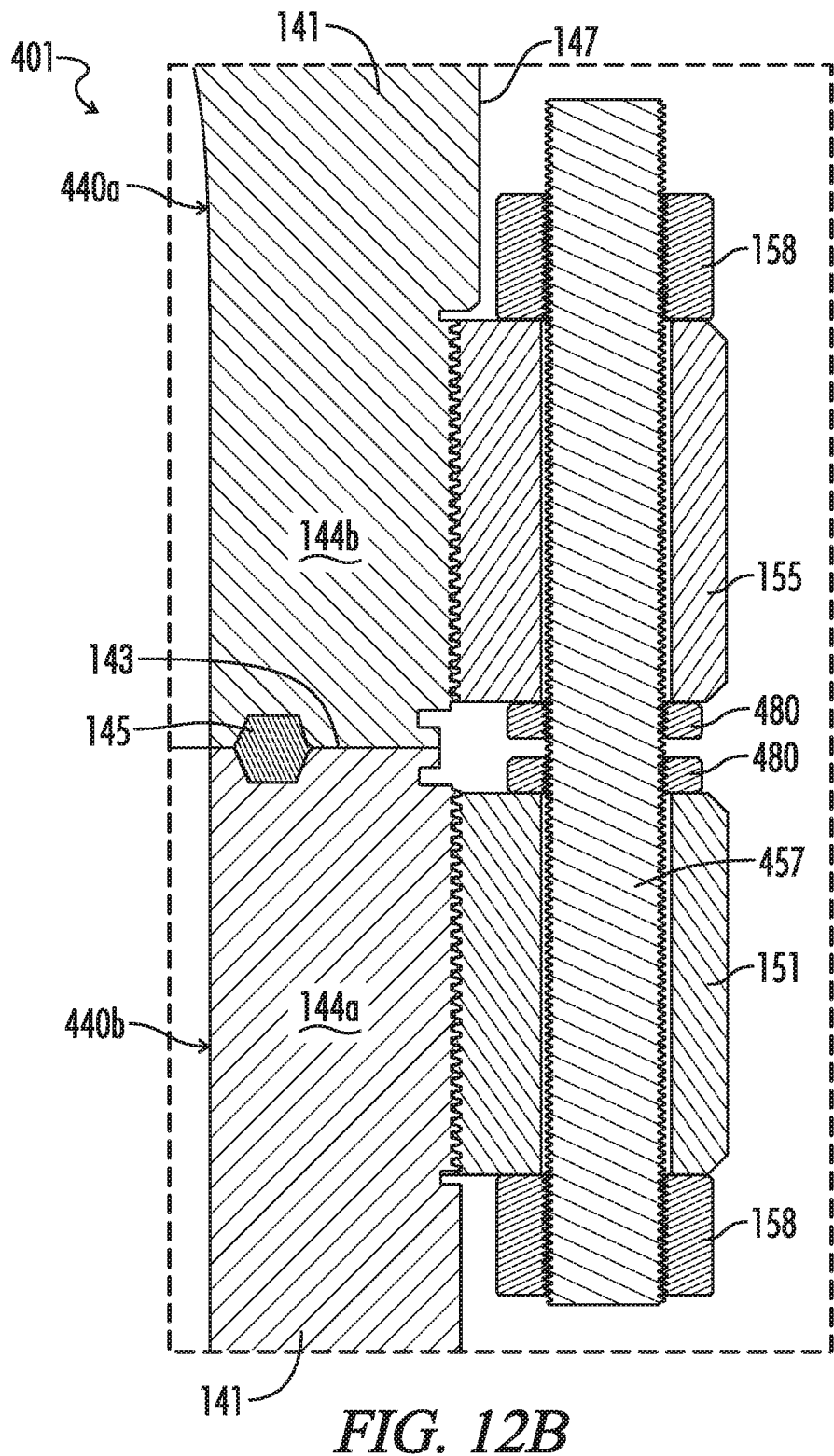

For example, a fifth preferred embodiment 440 of the novel rotatable flowline components is a rotatable elbow fitting which comprises lock nuts 480 that provide clearance between rotatable elbows 440. A portion of a preferred swivel joint subassembly 401 which incorporates rotatable elbow fittings 440 is shown in FIGS. 12A and 12B. It will be appreciated that rotatable elbows 440 are identical to rotatable elbows 140 except in a few particulars. Specifically, rotatable elbows 440 do not incorporate snap rings 148, they incorporate double-end threaded bolts 457 instead of threaded studs 157, and they incorporate a plurality of lock nuts 480.

Lock nuts 480 are threaded onto double-end threaded bolts 457. As will be appreciated from FIG. 12A, a rotatable elbow 440a may first be loosely made up to another rotatable elbow 440b by inserting double-end bolts 457 through a flange, such as flange 155 on elbow 440a and securing them with nuts 158. Lock nuts 480 then may threaded on double-end bolts 457 to a spaced position. One lock nut 480 will abut flange 155. The other lock nut 480 will be in a position somewhat removed from flange 155. Rotatable elbow 440b then may be positioned such that double-end studs 457 on flange 155 of elbow 440a extend through flange 151 of elbow 440b. Importantly, lock nuts 480 are positioned on bolts 457 to provide separation between union face 143 of elbow 440a and union face 143 of elbow 440b and metal seal 145. Though described as loose because of the separation between elbows 440 and because there is no load on their union faces, nuts 158 typically will be tightened on bolts 457 to eliminate play in the connection between flanges 157 and 151.

When rotatable elbows 440 are thus loosely made up, their respective flanges 155 and 151 are rotationally locked to each other. Bodies 141 of elbows 440, however, may be rotated relative to each other about their common axis of rotation. Thus, rotatable elbows 440 may be positioned relative to each other to provide a 90° turn at whatever angle may be required for the course of the flow line. The clearance between elbows 440a and 440b, however, will prevent damage to their union faces 143 and seal 145 as they are rotated.

Once properly positioned, lower lock nuts 480 may be threaded toward flange 155 of elbow 440a. Lower lock nuts 480 will be threaded along bolts 457 a sufficient distance to allow flanges 151 and 155 to be drawn sufficiently together to transfer load to union faces 143 and fully make up the union between elbows 440a and 440b. It will be appreciated, of course, that it may not be necessary to provide lock nuts 480 on all bolts 457. A lesser number, such as three or four, may be sufficient to provide secure clearance between the rotatable components. Similarly, if threaded studs are used instead of double-end threaded bolts to connect the flanges, a single lock nut may be used on the studs to maintain clearance.

Figure 13:
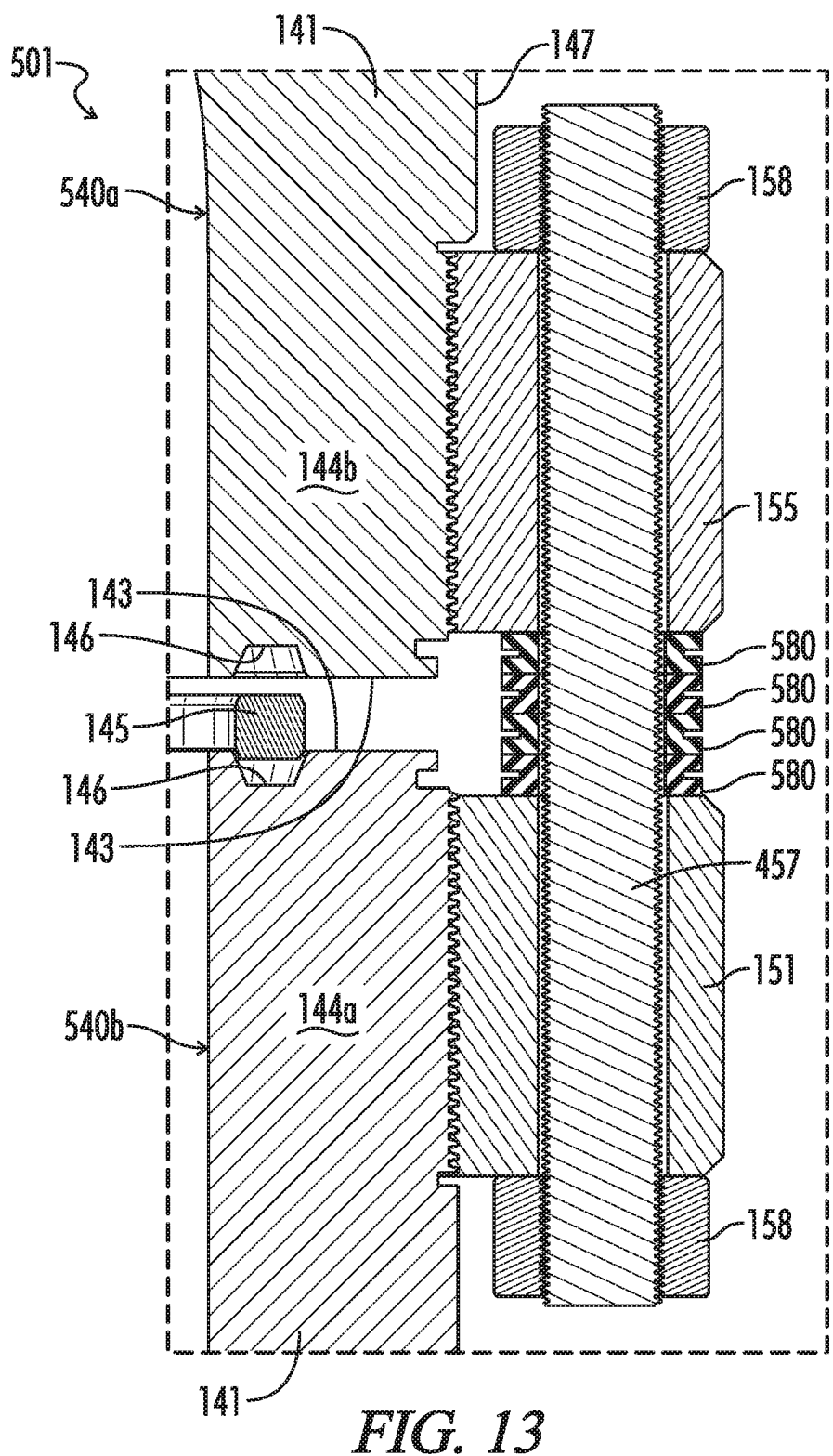
FIG. 13 is an enlarged, cross-sectional view of an assembly 501 of two sixth preferred embodiments 540 of the rotatable flowline components of the subject invention, which sixth embodiments 540 are rotatable elbow fittings having spacer grommets 580 which assist in making up the union between elbow fittings 540.

A sixth preferred embodiment 540 of the novel rotatable flowline components is a rotatable elbow fitting which comprises grommets 580. A portion of a preferred swivel joint assembly 501 which incorporates rotatable elbow fittings 540 is shown in FIG. 13. It will be appreciated that rotatable elbows 540 are identical to rotatable elbows 440 except that they incorporate grommets 580 instead of lock nuts 480.

As may be seen in FIG. 13, grommets 580 are installed around double-end bolts 457. Elbows 540 may be loosely made up by tightening nuts 158 to the point where flanges 155 and 151 initially contact grommets 580. Thus installed, like lock nuts 480, grommets 580 will provide clearance between elbows 540a and 540b. Elbows 540a and 540b may be rotated relative to each other without damaging their union faces 143 and metal seal 145.

Preferably, grommets 580 are fabricated from relatively hard, but elastically deformable material. Elastomers, such as nitrile butadiene rubber (NBR), hydrogenated nitrile butadiene nitrile rubber (HNBR), and fluoroelastomers such as Viton® may be suitable. Thus, once they have been properly positioned, the union between elbows 540a and 540b may be fully made up by continuing to tighten nuts 158. Grommets 580 will be laterally compressed allowing load to be transferred to union faces 143.

It will be appreciated, however, that a variety of spacers similar in essential respects to grommets 580 may be used to provide clearance between rotatable flowline components. The spacers may be elastically or inelastically deformable, or they may or may not be deformable. For example, essentially non-deformable metal or plastic spacers may be used. Such spacers preferably will be simply inserted laterally between flanges 155 and 151 and radially between bolts 457 as the union is being loosely made up and then removed to fully make up the union. Non-deformable spacers also may be installed on the threaded connector, similar to grommets 580. In such designs, the spacers necessarily will have to be removed so that the union may be made up fully. Thus, double-end threaded bolts preferably will be used to facilitate that process.

The spacer also may be formed of shaped metal, plastic, or other materials that allow the spacer to deform, but not elastically so. A spacer may have, for example, a configuration corresponding generally to an open, hemi-torus which may be flattened after the components have been positioned and the union is being made up fully. Other deformable configurations are known and may be used. Frangible spacers which may be crushed as the union is fully made up also may be used. Moreover, even if deformable, the spacers may be insertable between the flanges instead of being carried around the connectors.

Figure 14:
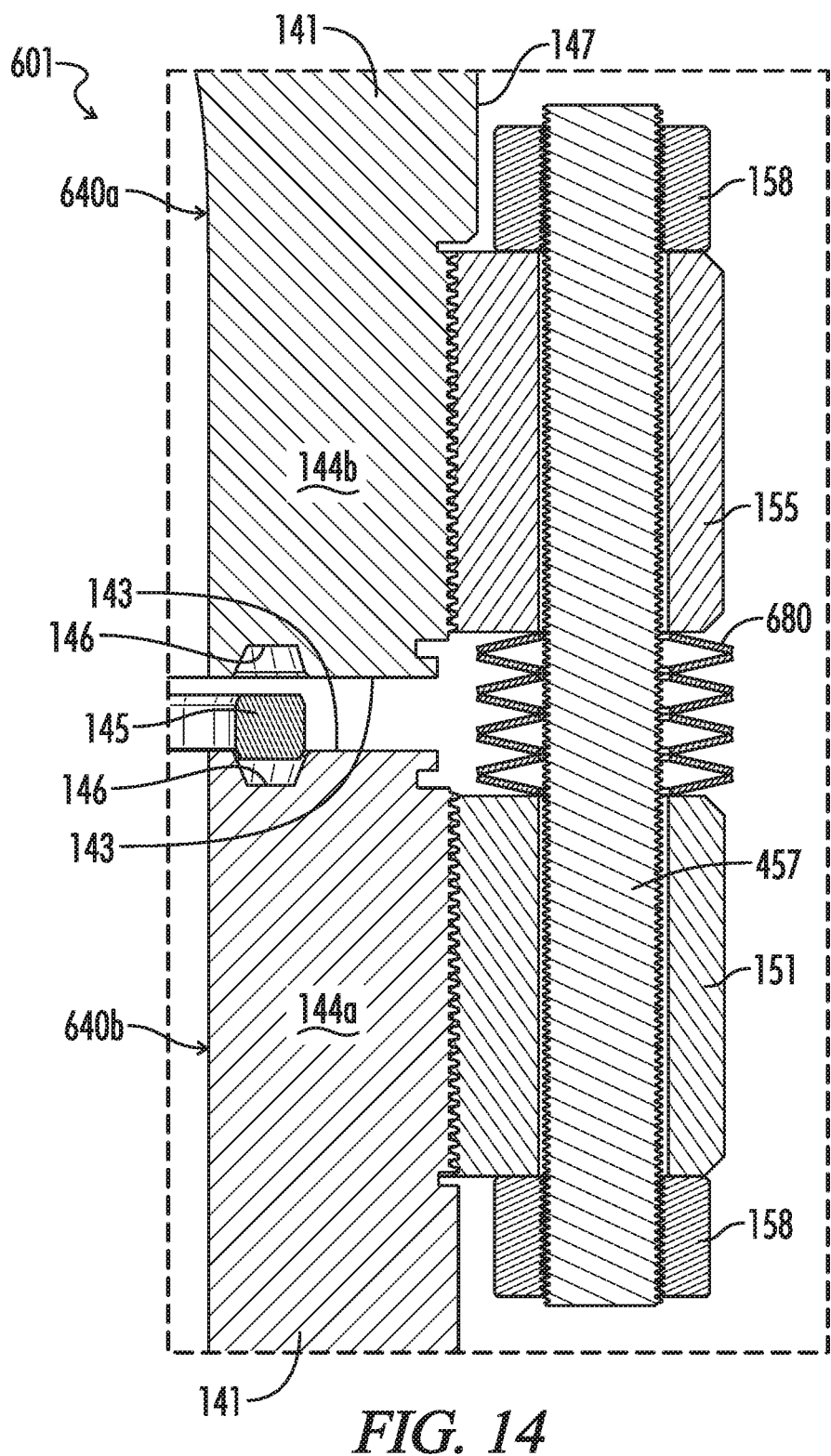
FIG. 14 is an enlarged, cross-sectional view of an assembly 601 of two seventh preferred embodiments 640 of the rotatable flowline components of the subject invention, which seventh embodiments 640 are rotatable elbow fittings having Belleville washers 680 which assist in making up the union between elbow fittings 640.

Other elastically deformable spacers also may be used in the novel rotatable flowline components. For example, a seventh preferred embodiment 640 of the novel rotatable flowline components is a rotatable elbow fitting which comprises Belleville washers 680. A portion of a preferred swivel joint assembly 601 which incorporates rotatable elbow fittings 640 is shown in FIG. 14. It will be appreciated that rotatable elbows 640 are identical to rotatable elbows 540 except that they incorporate Belleville washers 680 instead of grommets 580.

Belleville washers 680 are of conventional design. As may be seen in FIG. 14, they are installed around double-end bolts 457 and function essentially in the same manner as grommets 580. They will provide clearance between elbows 540a and 540b when it is loosely made up, thus allowing elbows 540a and 540b to be rotated without damage. Once elbows 540a and 540b have been properly position, Belleville washers 680 will compress as the union is being made up fully.

Figure 15A:
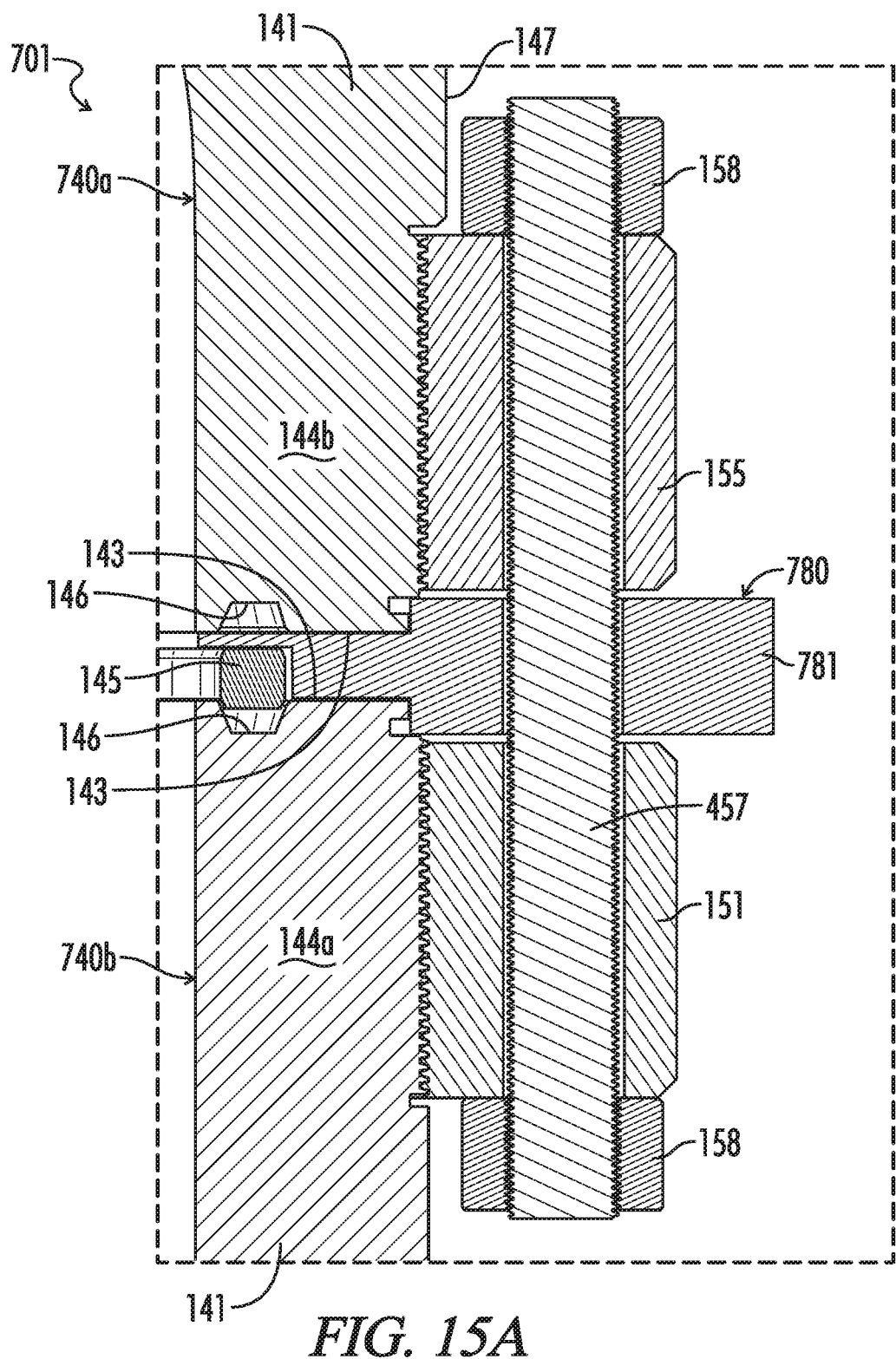
FIG. 15A is an enlarged, cross-sectional view of an assembly 701 of two eighth preferred embodiments 740 of the rotatable flowline components of the subject invention, which eighth embodiments 740 are rotatable elbow fittings having bearing plates 780 which assist in making up the union between elbow fittings 740.
Figure 15B:
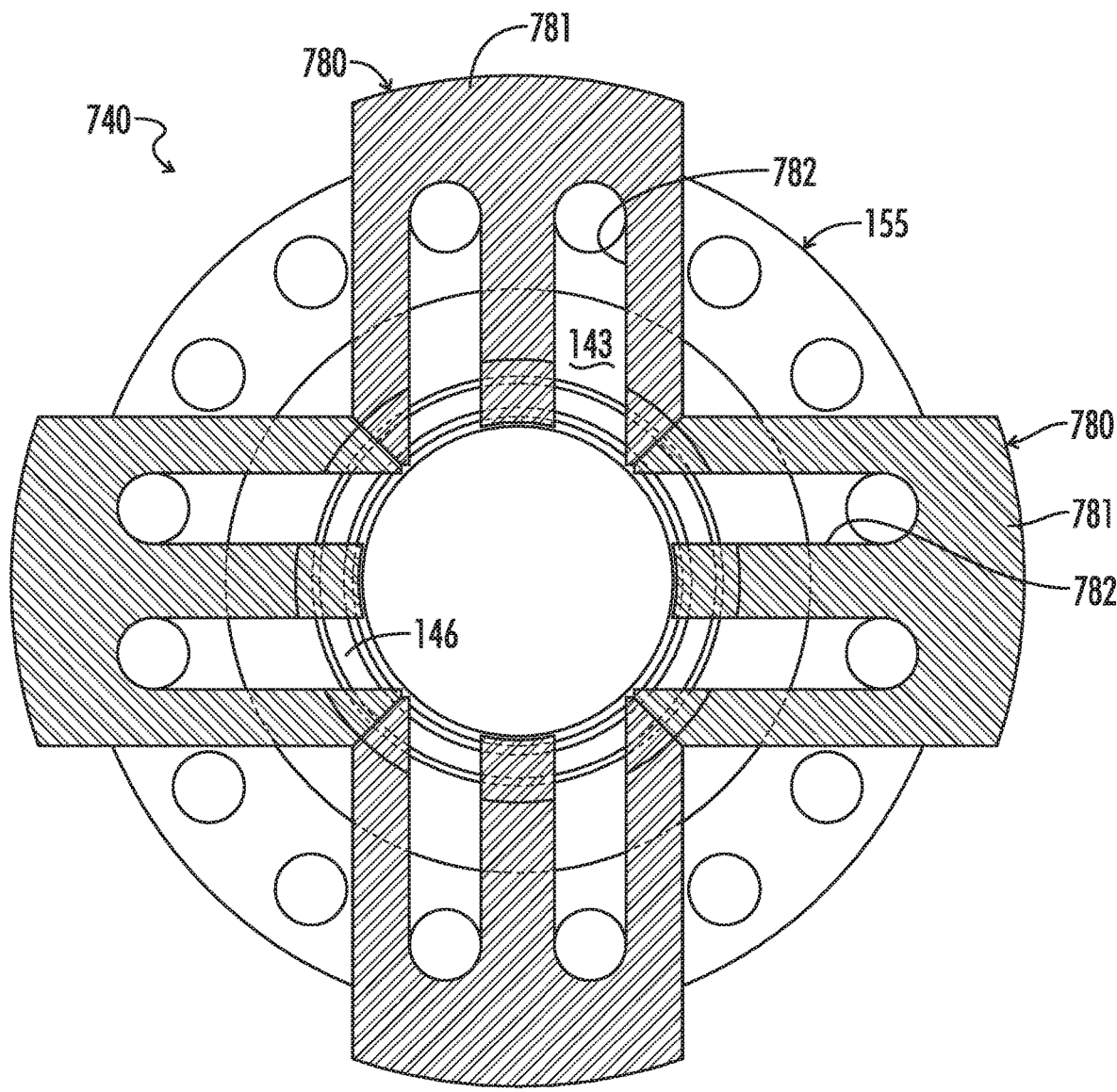
FIG. 15B is a bottom view of rotatable elbow 740a and bearing plates 780.

In addition to spacers, such as those exemplified above, the novel rotatable flowline components may incorporate bearing plates as separators. The bearing plates will be disposed between the union faces of the components to allow them to rotate thereon, as compared to the spacers which provide clearance between the union faces. For example, an eighth preferred embodiment 740 of the novel rotatable flowline components is a rotatable elbow fitting which comprises bearing plates 780. A portion of a preferred swivel joint assembly 701 which incorporates rotatable elbow fittings 740 is shown in FIGS. 15A and 15B. It will be appreciated that rotatable elbows 740 are identical to rotatable elbows 540 except that they incorporate bearing plates 780 instead of grommets 580.

As shown in FIG. 15, bearing plates 780 comprise a body 781 having a pair of slots 782. Plates 780 will be installed by inserting them between union faces 143 of elbows 740a and 740b. Slots 782 allow insertion of plates 780 beyond double-end bolts 457. They are configured such that plates 780 will be properly positioned when bolts 457 bottom out in slots 782. When thus positioned, the radially outer portions of union faces 143 of elbows 740 will bear on the major thickness of plates 780. A somewhat thinner, radially inward portion of plates 780 will extend over seal 145, preferably providing a slight clearance therebetween.

Thus, the union between elbows 740a and 740b may be loosely made up by tightening nuts 158 to the point where their union faces 143 bear on plates 780, but lightly so. Elbows 740 then may be rotated relative to each other. When elbows 740 are properly positioned, plates 780 may be slid out from between elbows 740 and the union made up fully.

Spacers 780 are designed to slip past a pair of double-end bolts 457. Their inner ends are beveled to allow four spacers 780 to extend substantially across the width of union faces 143. It will be appreciated, however, that similar spacers may be configured in many different ways. The spacers may be somewhat shorter, for example, or they may have a single slot, or no slots, or holes. More or fewer spacers also may be used.

Figure 16A:
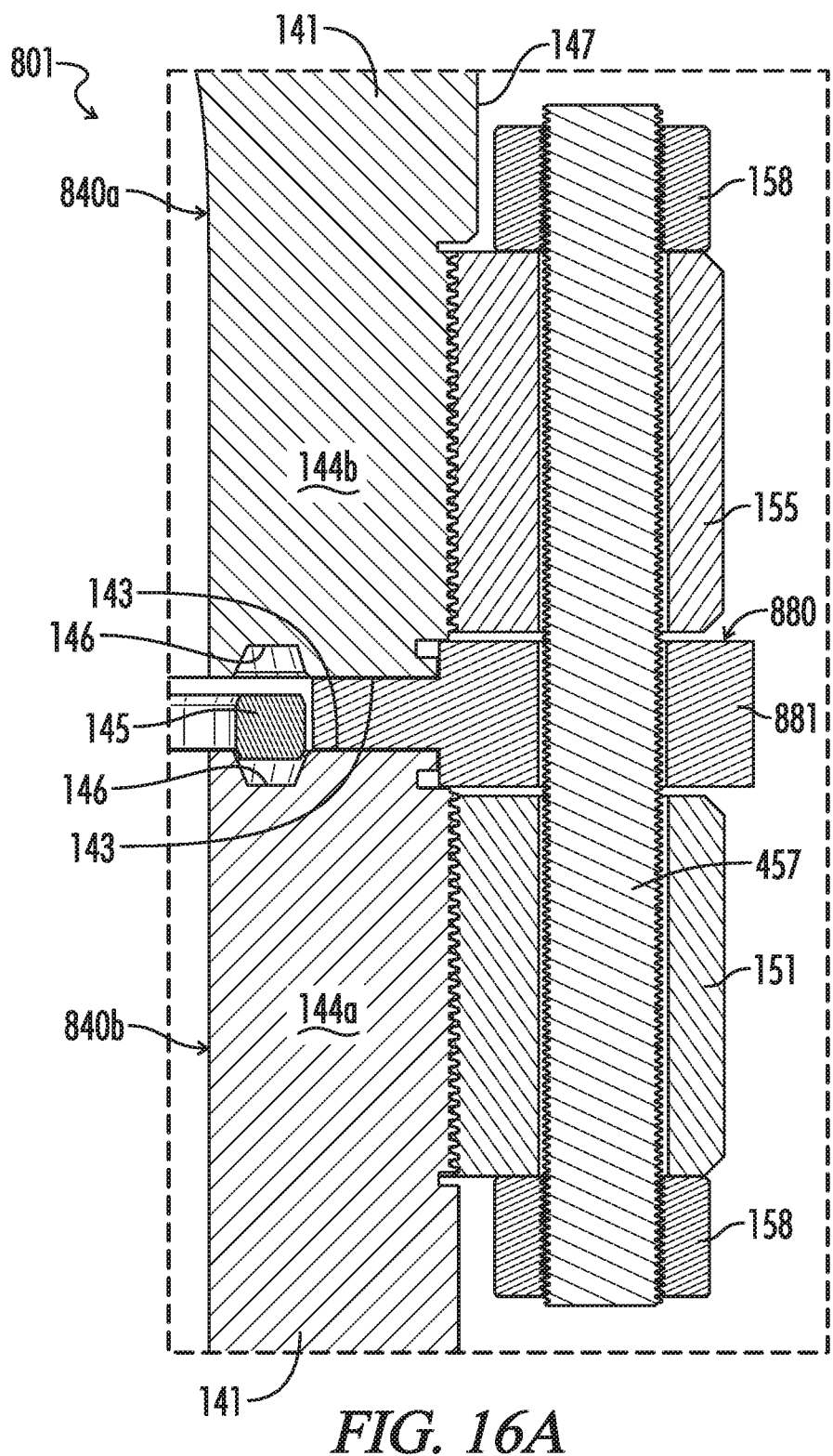
FIG. 16A is an enlarged, cross-sectional view of an assembly of two ninth preferred embodiments 840 of the rotatable flowline components of the subject invention, which ninth embodiments 840 are rotatable elbow fittings having bearing plates 880 which assist in making up the union between elbow fittings 840.
Figure 16B:
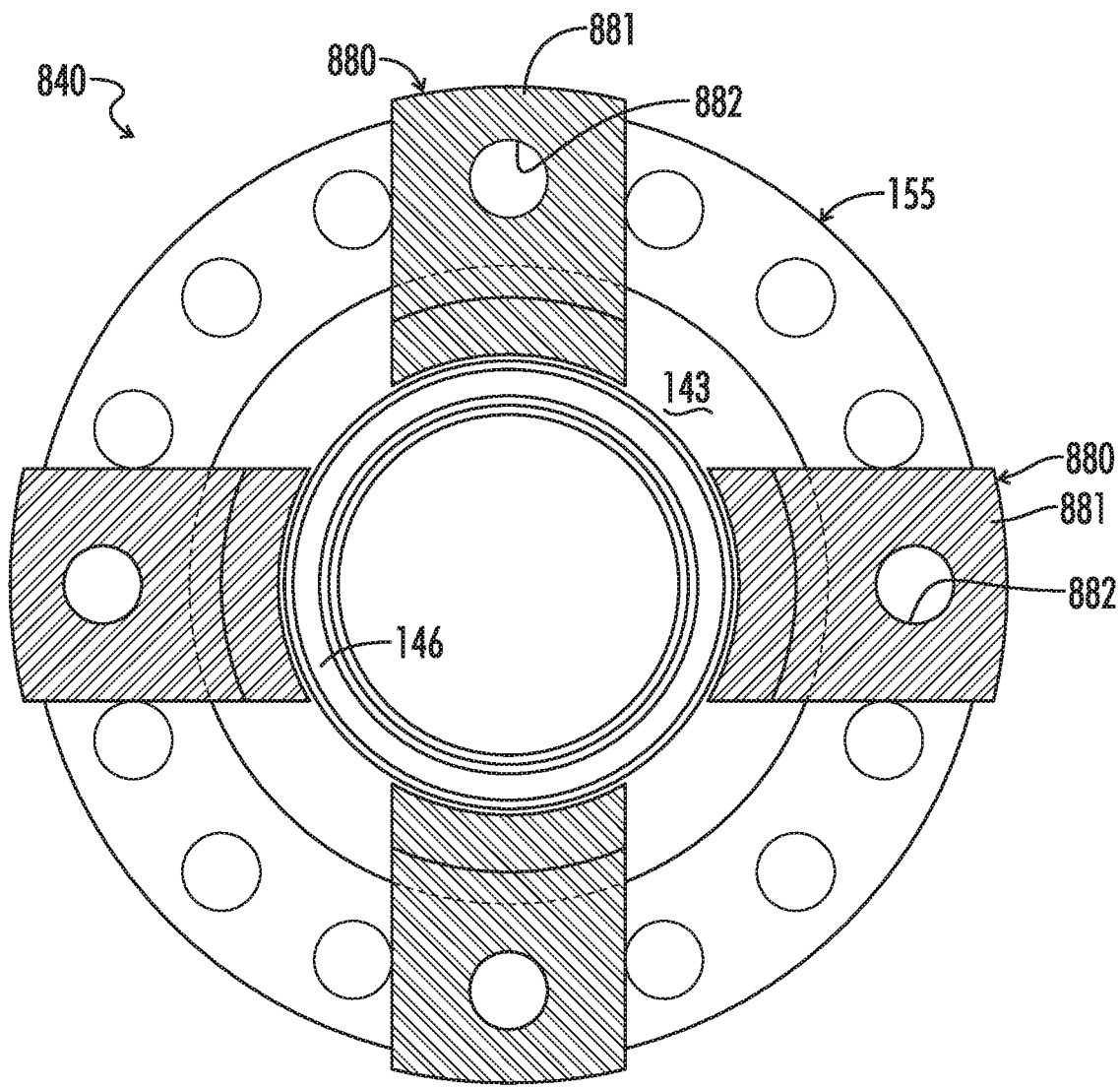
FIG. 16B is a bottom view of rotatable elbow 840a and bearing plates 880.

For example, a ninth preferred embodiment 840 of the novel rotatable flowline components is a rotatable elbow fitting which comprises bearing plates 880. A portion of a preferred swivel joint assembly 801 which incorporates rotatable elbow fittings 840 is shown in FIGS. 16A and 16B. It will be appreciated that rotatable elbows 840 are identical to rotatable elbows 740 except that they incorporate bearing plates 880 instead of bearing plates 780.

As may be seen in FIG. 16, bearing plates 880 are quite similar to bearing plates 780. When plates 880 are installed, and elbows 840 are loosely made up, the radially outer portions of union faces 143 of elbows 840 will bear on plates 880. Plates 880, however, are installed by passing them over bolts 457.

Plates may be made of a variety of materials, such as metal, plastic, or other non-metallic materials. Preferably, however, they will be made of somewhat softer materials, that is, materials that are softer and more ductile than the union faces of the elbows or other rotatable components. Thus, if there is any misalignment of the union faces and plates as the components are being rotated or otherwise manipulated, the plates will absorb any damage that may result. For example, the plates may be made of aluminum or brass, or engineering plastics such as polycarbonates, Nylon 6, Nylon 66, and other polyamides, polyether ether ketone (PEEK), and polyetherimides such as Ultem®. Fiber reinforced plastics also may be used.

It also will be appreciated that the novel separators have been exemplified in the context of unions made up with double-end threaded bolts. Double-end bolts are greatly preferred for some embodiments of the separators, such as bearing plates 880 or non-deformable, non-insertable spacers. Such separators must be removed so that a union may be made up fully. For other embodiments, it may be equally convenient to use threaded studs. Deformable spacers, such as grommets 480 and Belleville washers 580, do not have to be removed to make up the union fully. Insertable spacers, such as bearing plates 780, may simply be withdrawn from between the elbows or other rotatable components to allow the union to be made up fully. It will not be necessary to first disassemble the components in order to make up the union.

The flowline components of the subject invention may be manufactured by methods and from materials commonly used in manufacturing flow iron components. Given the extreme stress and the corrosive and abrasive fluids to which flowline components are exposed, especially those designed for high-pressure, high-velocity flow lines, suitable materials will be hard and strong. For example, offset cross junctions 120, spools 30, rotatable elbows 140 and 240, and rotatable tee 160 except for their seals, may be manufactured from 4130 and 4140 chromoly steel or from somewhat harder, stronger steel such as 4130M7, high end nickel alloys, and stainless steel. The components may be made by any number of conventional techniques, but typically and in large part will be made by forging, extruding, or mold casting a blank part and then machining the required features into the part.

As noted above, the flow through the high-pressure side of frac systems can be quite turbulent, especially at the unions between flowline components. The novel flowline components, therefore, may incorporate a wear sleeve. The design and fabrication of such wear sleeves are described in the '102 application. In general, such wear sleeves may be adapted for use in the novel rotatable flowline components.

The novel single line frac system preferably will be installed within and supported by a modular skid system, such as the skids disclosed in the '102 application. The skids are designed to restrict movement of flowline components if the union between the components fail. In addition, the skids are adjustable. Components carried within the skid may be adjusted along three axes to allow easy and precise positioning to facilitate assembly of the flow line. The skids are modular, and may be interconnected to facilitate transportation of the flow line in pre-assembled subassemblies to the site. Given that the components are quite heavy and as a practical matter must be handled with mechanical lifts, the novel flowline components typically incorporate various lifting eyes or other features facilitating lifting of the component. For example, threaded holes may be provided at one or more locations in the body or flanges of the components, allowing lifting eyes to be threaded into the component.

The novel flow lines and rotatable components have been described in the context of frac systems. While frac systems in particular and the oil and gas industry in general rely on temporary flow lines, the invention is not limited to such applications or industries. Suffice it to say that the novel flow lines and rotatable components have wide applicability in those fluid transportation systems where temporary flow lines have been conventionally applied.

While this invention has been disclosed and discussed primarily in terms of specific embodiments thereof, it is not intended to be limited thereto. Other modifications and embodiments will be apparent to the worker in the art.

What is claimed is:

1. A rotatable flanged component adapted for assembly into a flow line of a high-pressure fluid transportation system, said rotatable flanged component comprising:

(a) a component body having at least two ends and a conduit extending between said ends, each said component body end having a union face, said union face comprising a flat bearing surface extending around said conduit and having an annular groove in said bearing surface adapted to receive a seal;

(b) a flange at each said component body end, said flange and said union face being adapted to provide a flange-to-flange type union between said component and another flowline component;

(c) wherein at least one said body end has external threads;

(d) wherein at least one said flange is a rotatable flange, said rotatable flange having a central opening having internal threads and a plurality of holes, said holes adapted to accommodate threaded connectors for loading said rotatable flange with an axial force;

(e) wherein said rotatable flange is mounted on said one body end through said central opening by engaging said internal threads of said central opening with said external threads on said one body end, said threaded engagement allowing rotation between said body and said rotatable flange about an axis normal to said union face and transmitting said axial force to said one body end and its said union face.

2. The rotatable flanged component of claim 1, wherein said conduit provides a change in the course of said conduit through said component, whereby said component is adapted to provide a change in the course of a flow line.

3. The rotatable flanged component of claim 2, wherein said component comprises stops to limit said rotation of said rotatable flange.

4. The rotatable flanged component of claim 3, wherein said body end comprises a shoulder providing a first stop limiting rotation in one direction and a snap ring limiting rotation in the other direction.

5. The rotatable flanged component of claim 3, wherein said rotation of said rotatable flange is limited to about 360°.

6. The rotatable flanged component of claim 2, wherein said component is a block fitting.

7. The rotatable flanged component of claim 2, wherein:
(a) each said body end has external threads;
(b) wherein each said flange at said body ends is a rotatable flange, said rotatable flange having a central opening having internal threads and a plurality of holes, said holes adapted to accommodate threaded connectors for loading said rotatable flange with an axial force;
(c) wherein said rotatable flange is mounted on said body end through said central opening by engaging said internal threads of said central opening with said external threads on said body end, said threaded engagement allowing rotation between said body and said rotatable flange about an axis normal to said union face and transmitting said axial force to said body end and its said union face.

8. The rotatable flanged component of claim 1, wherein said component is a directional fitting.

9. The rotatable flanged component of claim 1, wherein said component comprises stops to limit said rotation of said rotatable flange.

10. The rotatable flanged component of claim 9, wherein said body end comprises a shoulder providing a first stop limiting rotation in one direction and a snap ring limiting rotation in the other direction.

11. The rotatable flanged component of claim 9, wherein said rotation of said rotatable flange is limited to about 360°.

12. The rotatable flanged component of claim 1, wherein said component is a block fitting.

13. The rotatable flanged component of claim 1, wherein:
(a) each said body end has external threads;
(b) wherein each said flange at said body ends is a rotatable flange, said rotatable flange having a central opening having internal threads and a plurality of holes, said holes adapted to accommodate threaded connectors for loading said rotatable flange with an axial force;
(c) wherein said rotatable flange is mounted on said body end through said central opening by engaging said internal threads of said central opening with said external threads on said body end, said threaded engagement allowing rotation between said body and said rotatable flange about an axis normal to said union face and transmitting said axial force to said body end and its said union face.

14. The rotatable flanged component of claim 13, wherein said union faces are perpendicular to each other and said conduit provides a 90° turn.

15. The rotatable flanged component of claim 13, wherein said union faces are perpendicular to each other and said conduit is a long sweep conduit providing a 90° turn.

16. The rotatable flanged component of claim 1, wherein said union faces are perpendicular to each other and said conduit is a long sweep conduit providing a 90° turn.

17. The rotatable flanged component of claim 1, wherein said component is a junction fitting comprising three said body ends; each said body end having a union face, said union face comprising a flat bearing surface extending around said conduit and having an annular groove in said bearing surface adapted to receive a seal.

18. The rotatable flanged component of claim 17, wherein:
(a) each said body end has external threads:
(b) wherein each said flange at said body ends is a rotatable flange, said rotatable flange having a central opening having internal threads and a plurality of holes, said holes adapted to accommodate threaded connectors for loading said rotatable flange with an axial force;
(c) wherein said rotatable flange is mounted on said body end through said central opening by engaging said internal threads of said central opening with said external threads on said body end, said threaded engagement allowing rotation between said body and said rotatable flange about an axis normal to said union face and transmitting said axial force to said body end and its said union face.

19. The rotatable flanged component of claim 1, wherein said union faces are perpendicular to each other and said conduit provides a 90° turn.

20. A flow line for a high-pressure fluid transportation system, said flow line comprising a rotatable flanged component of claim 1 assembled into said flow line by flange-to-flange type unions.

21. A high-pressure fluid transportation system, said system comprising a flow line of claim 20.

22. The high-pressure fluid transportation system of claim 21, wherein said system is a frac system.

23. A flow line for a frac system, said flow line providing flow to a well head and comprising a rotatable flanged component of claim 2 assembled into said flow line upstream of said well head.

24. A flow line for a frac system, said flow line providing flow to a well head and comprising a rotatable flanged component of claim 13 assembled into said flow line upstream of said well head.

25. A flow line for a frac system, said flow line providing flow to a well head and comprising a rotatable flanged component of claim 16 assembled into said flow line upstream of said well head.

26. A flow line for a frac system, said flow line providing flow to a well head and comprising a rotatable flanged component of claim 1, wherein said union faces are perpendicular to each other, said conduit provides a 90° turn, and said rotatable flanged component is assembled into said flow line upstream of said well head.

27. A flow line for a frac system, said flow line providing flow to a well head and comprising a rotatable flanged component of claim 13, wherein said union faces are perpendicular to each other, said conduit provides a 90° turn, and said rotatable flanged component is assembled into said flow line upstream of said well head.

28. A method of assembling a flow line for a high-pressure fluid transportation system, said method comprising assembling a rotatable flanged component of claim 1 into said flow line by connecting said rotatable flanged component to other flowline components by a flange-to-flange type union.

29. A method of providing a change in the course of a flow line for a high-pressure fluid transportation system, said method comprising assembling a rotatable flanged component of claim 2 into said flow line by connecting said rotatable flanged component to other flowline components by a flange-to-flange type union.

30. A method of assembling a flange-to-flange type union between a rotatable flanged component and a second component:
   (a) wherein said rotatable flanged component comprises a component body defining a conduit, a rotatable flange, and a union face, said union face comprising a flat bearing surface extending around said conduit and having an annular groove in said bearing surface adapted to receive a seal;
   (b) wherein said second component comprises a component body defining a conduit, a flange, and a union face, said union face comprising a flat bearing surface extending around said conduit and having an annular groove in said bearing surface adapted to receive a seal;
   (c) wherein said method comprises:
      i) extending said rotatable flange beyond the plane of said union face on said rotatable flanged component;
      ii) loosely assembling said rotatable flanged component to said second component to restrict rotation of said rotatable flange relative to said flange of said second component and allow rotation of said component body of said rotatable flanged component relative to said rotatable flange, said extended rotatable flange providing clearance between said union face of said rotatable flanged component and said union face of said second component;
      iii) positioning said rotatable flanged component relative to said second component by rotating said component body of said rotatable flanged component about said rotatable flange; and
      iv) withdrawing said rotatable flange within the plane of said union face on said rotatable flanged component, whereby a flange-to-flange type union may be made up between said rotatable flanged component and said second component when said rotatable flange is withdrawn.

31. The method of claim 30, wherein said rotatable flange of said rotatable flanged component and said flange of said second component bear on each other when said rotatable flanged component and said second flanged component are loosely assembled.

* * * * *

UNITED STATES PATENT AND TRADEMARK OFFICE
CERTIFICATE OF CORRECTION

PATENT NO. : 10,995,561 B1  
APPLICATION NO. : 15/804353  
DATED : May 4, 2021  
INVENTOR(S) : Todd Anthony Travis et al.

Page 1 of 1

It is certified that error appears in the above-identified patent and that said Letters Patent is hereby corrected as shown below:

On the Title Page

Item (12) "Travix et al." should read as --Travis et al.--; and  
Item (72) Inventor(s): the first inventor, "Todd Anthony Travix, Humble, TX (US)" should read as --Todd Anthony Travis, Humble, TX (US)--.

Signed and Sealed this  
Twenty-second Day of March, 2022

Drew Hirshfeld  
*Performing the Functions and Duties of the*  
*Under Secretary of Commerce for Intellectual Property and*  
*Director of the United States Patent and Trademark Office*